(12) United States Patent
Shin et al.

(10) Patent No.: US 10,764,733 B2
(45) Date of Patent: Sep. 1, 2020

(54) WEARABLE APPARATUS, MANAGEMENT SERVER, MANAGEMENT SYSTEM HAVING THE SAME, AND METHOD FOR CONTROLLING THEREOF

(71) Applicant: Samsung Electronics Co., Ltd., Gyeonggi-do (KR)

(72) Inventors: Ji-yeon Shin, Gyeonggi-do (KR); Young-ei Cho, Seoul (KR); Yong-ju Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 128 days.

(21) Appl. No.: 14/757,971

(22) Filed: Dec. 23, 2015

(65) Prior Publication Data
US 2016/0179075 A1 Jun. 23, 2016

(30) Foreign Application Priority Data

Dec. 23, 2014 (KR) .......................... 10-2014-0187244

(51) Int. Cl.
*H04W 4/70* (2018.01)

(52) U.S. Cl.
CPC .................... *H04W 4/70* (2018.02)

(58) Field of Classification Search
CPC ....... G05B 19/048; G05B 2219/23227; H04W 4/005
USPC ...................................................... 700/275
See application file for complete search history.

(56) References Cited

U.S. PATENT DOCUMENTS

| | | |
|---|---|---|
| 8,856,061 B2 | 10/2014 | Baughman et al. |
| 2004/0039254 A1 | 2/2004 | Stivoric et al. |
| 2006/0053377 A1 | 3/2006 | Newell et al. |
| 2010/0250554 A1 | 9/2010 | Shu |
| 2013/0197678 A1* | 8/2013 | Ara ........................ G05B 19/02 700/83 |
| 2014/0107531 A1 | 4/2014 | Baldwin |

(Continued)

FOREIGN PATENT DOCUMENTS

| | | |
|---|---|---|
| CN | 203724574 | 7/2014 |
| CN | 104077495 | 10/2014 |

(Continued)

OTHER PUBLICATIONS

Uchida Tatsuya, Mobile Terminal, May 31, 2007, Translated Japnese document JP2007135008.*

(Continued)

*Primary Examiner* — Robert E Fennema
*Assistant Examiner* — Christopher W Carter
(74) *Attorney, Agent, or Firm* — The Farrell Law Firm, P.C.

(57) ABSTRACT

A management server is provided. The management server includes a communication interface unit configured to receive user environment information from a plurality of wearable apparatuses located in a preset space, an analyzer configured to analyze an environment state of the preset space based on a plurality of pieces of the received user environment information regarding the plurality of wearable apparatuses and determines an operation state of a common device located in the preset space according to the analyzed environment state, and a controller configured to control the communication interface unit so as to operate the common device according to the determined operation state.

20 Claims, 35 Drawing Sheets

300

(56) References Cited

U.S. PATENT DOCUMENTS

| | | | |
|---|---|---|---|
| 2014/0132158 A1 | 5/2014 | Land et al. | |
| 2014/0135997 A1* | 5/2014 | Bradley | F24F 11/0001 700/278 |
| 2014/0156084 A1* | 6/2014 | Rahman | A61B 5/681 700/276 |
| 2014/0334271 A1* | 11/2014 | Park | G04G 21/04 368/10 |
| 2014/0365591 A1 | 12/2014 | Sun | |
| 2016/0016454 A1* | 1/2016 | Yang | B60R 16/037 701/36 |

FOREIGN PATENT DOCUMENTS

| | | | |
|---|---|---|---|
| JP | 2005-208788 | 8/2005 | |
| JP | 2007135008 A * | 5/2007 | |
| WO | WO-2015127070 A1 * | 8/2015 | G06F 1/163 |

OTHER PUBLICATIONS

International Search Report dated May 4, 2016 issued in counterpart application No. PCT/KR2015/014200, 10 pages.
European Search Report dated Nov. 23, 2017 issued in counterpart application No. 15873662.9-1870, 6 pages.
European Search Report dated Jan. 31, 2019 issued in counterpart application No. 15873662.9-1218, 4 pages.
Chinese Office Action dated Aug. 27, 2019 issued in counterpart application No. 201580070990.9, 18 pages.
Chinese Office Action dated Jan. 13, 2020 issued in counterpart application No. 201580070990.9, 17 pages.
Chinese Office Action dated Apr. 21, 2020 issued in counterpart application No. 201580070990.9, 19 pages.
European Search Report dated May 13, 2020 issued in counterpart application No. 15873662.9-1218, 4 pages.

* cited by examiner

FIG. 7

|  |  | Pleasantness | | |
|---|---|---|---|---|
|  |  | Low | Mid | High |
| Arousal | High | TENSION STRESS | ENHANCEMENT LIVELINESS | EXCITEMENT |
|  | Mid | SADNESS UNHAPPINESS | - | HAPPINESS DELIGHT |
|  | Low | FATIGUE EXHAUSTION DEPRESSION | SILENCE SPEEPINESS | CALMNESS SLOWNESS |

| ECG | HRV | S.Tmp | PLEASANTNESS | AROUSAL | STATE |
|---|---|---|---|---|---|
| NO CHANGE | DECREASE | INCREASE | Mid | Low | SLEEPINESS |
| SENSE CHANGE | INCREASE | DECREASE | Low | High | TENSION/STRESS |
| NO CHANGE | NO CHANGE | NO CHANGE | Mid | Mid | NEUTRALITY/ERROR |
| NO CHANGE | DECREASE | DECREASE | ...... | ...... | ...... |
| NO CHANGE | DECREASE | NO CHANGE | ...... | ...... | ...... |
| NO CHANGE | NO CHANGE | DECREASE | ...... | ...... | ...... |
| NO CHANGE | NO CHANGE | INCREASE | ...... | ...... | ...... |
| NO CHANGE | INCREASE | DECREASE | ...... | ...... | ...... |
| NO CHANGE | INCREASE | NO CHANGE | ...... | ...... | ...... |
| NO CHANGE | INCREASE | INCREASE | ...... | ...... | ...... |
| SENSE CHANGE | DECREASE | DECREASE | ...... | ...... | ...... |
| SENSE CHANGE | DECREASE | NO CHANGE | ...... | ...... | ...... |
| SENSE CHANGE | DECREASE | INCREASE | ...... | ...... | ...... |
| SENSE CHANGE | NO CHANGE | DECREASE | ...... | ...... | ...... |
| SENSE CHANGE | NO CHANGE | NO CHANGE | ...... | ...... | ...... |
| SENSE CHANGE | NO CHANGE | INCREASE | ...... | ...... | ...... |
| SENSE CHANGE | INCREASE | NO CHANGE | ...... | ...... | ...... |
| SENSE CHANGE | INCREASE | INCREASE | ...... | ...... | ...... |

FIG. 9

| STATE | EMG | GSR | SpO2 | STATE CODE |
|---|---|---|---|---|
| SLEEPINESS | NO CHANGE | DECREASE | DECREASE | OXYGEN LACK,SLEEPINESS |
| SLEEPINESS | NO CHANGE | DECREASE | NO CHANGE | DROWSINESS |
| SLEEPINESS | NO CHANGE | NO CHANGE | DECREASE | OXYGEN LACK |
| SLEEPINESS | NO CHANGE | NO CHANGE | NO CHANGE | ...... |
| SLEEPINESS | NO CHANGE | NO CHANGE | INCREASE | ...... |
| SLEEPINESS | NO CHANGE | INCREASE | DECREASE | ...... |
| SLEEPINESS | NO CHANGE | INCREASE | NO CHANGE | ...... |
| SLEEPINESS | NO CHANGE | INCREASE | INCREASE | ...... |
| SLEEPINESS | NO CHANGE | DECREASE | INCREASE | ...... |
| SLEEPINESS | SENSE CHANGE | DECREASE | DECREASE | ...... |
| SLEEPINESS | SENSE CHANGE | DECREASE | NO CHANGE | ...... |
| SLEEPINESS | SENSE CHANGE | DECREASE | INCREASE | ...... |
| SLEEPINESS | SENSE CHANGE | NO CHANGE | DECREASE | ...... |
| SLEEPINESS | SENSE CHANGE | NO CHANGE | NO CHANGE | ...... |
| SLEEPINESS | SENSE CHANGE | NO CHANGE | INCREASE | ...... |
| SLEEPINESS | SENSE CHANGE | INCREASE | DECREASE | ...... |
| SLEEPINESS | SENSE CHANGE | INCREASE | NO CHANGE | ...... |
| SLEEPINESS | SENSE CHANGE | INCREASE | INCREASE | ...... |

| NETWORK | POSITION | TIME | SCHEDULE |
|---|---|---|---|
| Conference_Room1 | 37.496540, 127.026942 | ...... | ...... |
| Conference_Room1 | 37.496540, 127.026942 | 12:00:00 | LUNCH |
| Conference_Room1 | 37.496540, 127.026942 | 13:00:00 | BUSINESS CONFERENCE |
| Conference_Room1 | 37.496540, 127.026942 | 15:00:00 | REST |
| Conference_Room1 | 37.496540, 127.026942 | 15:30:00 | OUTPUT BUSINESS |
| ...... | ...... | ...... | ...... |

1020

| NETWORK | POSITION | SCHEDULE | ILLUMINANCE | NOISE | SITUATION CODE |
|---|---|---|---|---|---|
| Conference_Room1 | 37.496540, 127.026942 | BUSINESS CONFERENCE | 30 lx OR LESS | 30 db OR LESS | PRESENTATION, LISTENING (LIGHTS-OUT, LOW VOICE CONVERSATION) |
| Conference_Room1 | 37.496540, 127.026942 | BUSINESS CONFERENCE | 30~300 lx | 30 db OR LESS | PRESENTATION, LISTENING (LOW LIGHT, LOW VOICE CONVERSATION) |
| Conference_Room1 | 37.496540, 127.026942 | BUSINESS CONFERENCE | 300~600 lx | 30 db OR LESS | AT BUSINESS (GENERAL LIGHT, LOW VOICE CONVERSATION) |
| Conference_Room1 | 37.496540, 127.026942 | BUSINESS CONFERENCE | 600 lx OR MORE | 30 db OR LESS | WHILE CAPTURING (STRONG LIGHT, LOW VOICE CONVERSATION) |
| Conference_Room1 | 37.496540, 127.026942 | BUSINESS CONFERENCE | 30 lx OR LESS | 30~60 db | PRESENTATION, DURING CONVERSATION |
| Conference_Room1 | 37.496540, 127.026942 | BUSINESS CONFERENCE | 30~300 lx | 30~60 db | PRESENTATION, DURING CONVERSATION |
| Conference_Room1 | 37.496540, 127.026942 | BUSINESS CONFERENCE | 300~600 lx | 30~60 db | AT BUSINESS, DURING CONVERSATION |
| Conference_Room1 | 37.496540, 127.026942 | BUSINESS CONFERENCE | 600 lx OR MORE | 30~60 db | WHILE CAPTURING, DURING CONVERSATION |
| Conference_Room1 | 37.496540, 127.026942 | BUSINESS CONFERENCE | 30 lx OR LESS | 60~80 db | ...... |
| Conference_Room1 | 37.496540, 127.026942 | BUSINESS CONFERENCE | 30~300 lx | 60~80 db | ...... |
| Conference_Room1 | 37.496540, 127.026942 | BUSINESS CONFERENCE | 300~600 lx | 60~80 db | ...... |
| Conference_Room1 | 37.496540, 127.026942 | BUSINESS CONFERENCE | 600 lx OR MORE | 60~80 db | ...... |
| Conference_Room1 | 37.496540, 127.026942 | BUSINESS CONFERENCE | 30 lx OR LESS | 80 db OR MORE | ...... |
| Conference_Room1 | 37.496540, 127.026942 | BUSINESS CONFERENCE | 30~300 lx | 80 db OR MORE | ...... |
| Conference_Room1 | 37.496540, 127.026942 | BUSINESS CONFERENCE | 300~600 lx | 80 db OR MORE | ...... |
| Conference_Room1 | 37.496540, 127.026942 | BUSINESS CONFERENCE | 600 lx OR MORE | 30~60 db | ...... |
| ...... | ...... | ...... | ...... | ...... | ...... |

FIG. 11

| STATE CODE | SITUATION CODE | PERSONAL CONTEXT (TEMPORARY) | PERSONAL CONTEXT (FINAL) |
|---|---|---|---|
| A | A | H | - |
| A | B | K | - |
| ...... | ...... | ...... | ...... |

| NETWORK | LOCATION | USER | STATE CODE | SITUATION CODE | PERSONAL CONTEXT | PERSONAL CONTEXT (FINAL) |
|---|---|---|---|---|---|---|
| Conference_Room1 | 37.496540, 127.026942 | 48:2C:6A:1E:59:3D | OXYGEN LACK, SLEEPINESS | PRESENTATION, LISTENING (LIGHTS-OUT, LOW VOICE CONVERSATION) | LIGHT: INCREASE,VOLUME: INCREASE LIGHTING: OPERATION, VENTILATION: OPERATION,SILENCE: OPERATION | NULL |
| Conference_Room1 | 37.496540, 127.026942 | 12:34:56:78:9A:BC | OXYGEN LACK, SLEEPINESS | PRESENTATION, LISTENING (LIGHTS-OUT, LOW VOICE CONVERSATION) | LIGHT: INCREASE,VOLUME: INCREASE LIGHTING: OPERATION, VENTILATION: OPERATION,SILENCE: OPERATION | NULL |
| Conference_Room1 | 37.496540, 127.026942 | 06:1A:BB:3F:13:01 | DROWSINESS | PRESENTATION, LISTENING (LOW LIGHT, LOW VOICE CONVERSATION) | LIGHT: INCREASE,VOLUME: INCREASE LIGHTING: OPERATION, VENTILATION: OPERATION,SILENCE: OPERATION | NULL |
| Conference_Room1 | 37.496540, 127.026942 | ...... | ...... | ...... | ...... | ...... |

| PERSONAL CONTEXT | SpO2 (REMEASUREMENT) | ILLUMINANCE (REMEASUREMENT) | PERSONAL CONTEXT (FINAL) |
|---|---|---|---|
| LIGHT: INCREASE,VOLUME: INCREASE, LIGHTING: OPERATION,VENTILATION: OPERATION, SILENCE: OPERATION | DECREASE | 30 lx OR LESS | LIGHT: INCREASE,VOLUME: INCREASE, LIGHTING: OPERATION,VENTILATION: OPERATION, SILENCE: OPERATION |
| LIGHT: INCREASE,VOLUME: INCREASE, LIGHTING: OPERATION,VENTILATION: OPERATION, SILENCE: OPERATION | DECREASE | 30~300 lx | LIGHT: INCREASE,VOLUME: INCREASE, LIGHTING: OPERATION,VENTILATION: OPERATION, SILENCE: OPERATION |
| LIGHT: INCREASE,VOLUME: INCREASE, LIGHTING: OPERATION,VENTILATION: OPERATION, SILENCE: OPERATION | DECREASE | 300~600 lx | LIGHT: MAINTENANCE,VOLUME: MAINTENANCE, LIGHTING: STOP,VENETILATION: OPERATION,SILENCE: RELEASE |
| LIGHT: INCREASE,VOLUME: INCREASE, LIGHTING: OPERATION,VENTILATION: OPERATION, SILENCE: OPERATION | DECREASE | 600 lx OR MORE | LIGHT: MAINTENANCE,VOLUME: MAINTENANCE, LIGHTING: STOP,VENETILATION: OPERATION,SILENCE: RELEASE |
| LIGHT: INCREASE,VOLUME: INCREASE, LIGHTING: OPERATION,VENTILATION: OPERATION, SILENCE: OPERATION | NO CHANGE | 30 lx OR LESS | LIGHT: INCREASE,VOLUME: INCREASE, LIGHTING: OPERATION,VENTILATION: OPERATION, SILENCE: OPERATION |
| LIGHT: INCREASE,VOLUME: INCREASE, LIGHTING: OPERATION,VENTILATION: OPERATION, SILENCE: OPERATION | NO CHANGE | 30~300 lx | LIGHT: INCREASE,VOLUME: INCREASE, LIGHTING: OPERATION,VENTILATION: OPERATION, SILENCE: OPERATION |
| LIGHT: INCREASE,VOLUME: INCREASE, LIGHTING: OPERATION,VENTILATION: OPERATION, SILENCE: OPERATION | NO CHANGE | 300~600 lx | LIGHT: MAINTENANCE,VOLUME: MAINTENANCE, LIGHTING: STOP,VENETILATION: OPERATION,SILENCE: RELEASE |
| LIGHT: INCREASE,VOLUME: INCREASE, LIGHTING: OPERATION,VENTILATION: OPERATION, SILENCE: OPERATION | NO CHANGE | 600 lx OR MORE | LIGHT: MAINTENANCE,VOLUME: MAINTENANCE, LIGHTING: STOP,VENETILATION: OPERATION,SILENCE: RELEASE |
| LIGHT: INCREASE,VOLUME: INCREASE, LIGHTING: OPERATION,VENTILATION: OPERATION, SILENCE: OPERATION | INCREASE | 30 lx OR LESS | LIGHT: INCREASE,VOLUME: INCREASE, LIGHTING: OPERATION,VENTILATION: OPERATION, SILENCE: OPERATION |
| LIGHT: INCREASE,VOLUME: INCREASE, LIGHTING: OPERATION,VENTILATION: OPERATION, SILENCE: OPERATION | INCREASE | 30~300 lx | LIGHT: INCREASE,VOLUME: INCREASE, LIGHTING: OPERATION,VENTILATION: OPERATION, SILENCE: OPERATION |
| LIGHT: INCREASE,VOLUME: INCREASE, LIGHTING: OPERATION,VENTILATION: OPERATION, SILENCE: OPERATION | INCREASE | 300~600 lx | LIGHT: MAINTENANCE,VOLUME: MAINTENANCE, LIGHTING: STOP,VENETILATION: OPERATION,SILENCE: RELEASE |
| LIGHT: INCREASE,VOLUME: INCREASE, LIGHTING: OPERATION,VENTILATION: OPERATION, SILENCE: OPERATION | INCREASE | 600 lx OR MORE | LIGHT: MAINTENANCE,VOLUME: MAINTENANCE, LIGHTING: STOP,VENETILATION: OPERATION,SILENCE: RELEASE |
| ........ | ........ | ........ | ........ |

FIG. 12C

| NETWORK | LOCATION | USER | STATE CODE | SITUATION CODE | PERSONAL CONTEXT | PERSONAL CONTEXT (FINAL) |
|---|---|---|---|---|---|---|
| Conference_Room1 | 37.496540, 127.026942 | 48:2C:6A: 1E:59:3D | OXYGEN LACK, SLEEPINESS | PRESENTATION, LISTENING (LIGHTS-OUT, LOW VOICE CONVERSATION) | LIGHT: INCREASE, VOLUME: INCREASE LIGHTING: OPERATION, VENTILATION :OPERATION, SILENCE: OPERATION | LIGHT: INCREASE, VOLUME: INCREASE LIGHTING: OPERATION, VENTILATION :OPERATION, SILENCE: OPERATION |
| Conference_Room1 | 37.496540, 127.026942 | 12:34:56: 78:9A:BC | OXYGEN LACK, SLEEPINESS | PRESENTATION, LISTENING (LIGHTS-OUT, LOW VOICE CONVERSATION) | LIGHT: INCREASE, VOLUME: INCREASE LIGHTING: OPERATION, VENTILATION :OPERATION, SILENCE: OPERATION | LIGHT: INCREASE, VOLUME: INCREASE LIGHTING: OPERATION, VENTILATION :OPERATION, SILENCE: OPERATION |
| Conference_Room1 | 37.496540, 127.026942 | 06:1A:BB: 3F:13:01 | DROWSINESS | PRESENTATION, LISTENING (LOW LIGHT, LOW VOICE CONVERSATION) | LIGHT: INCREASE, VOLUME: INCREASE LIGHTING: OPERATION, VENTILATION :OPERATION, SILENCE: OPERATION | LIGHT: INCREASE, VOLUME: INCREASE LIGHTING: OPERATION, VENTILATION :OPERATION, SILENCE: OPERATION |
| Conference_Room1 | 37.496540, 127.026942 | ...... | ...... | ...... | ...... | ...... |

| SITUATION | STATE | TRANSMISSION TARGET (SERVER) | PUBLIC SETTING |
|---|---|---|---|
| A | P | 10.100.69.220 | NO |
| ...... | ...... | ...... | ...... |
| ...... | ...... | ...... | ...... |

| USER | STATE CODE | SITUATION CODE | TRANSMISSION TARGET | PUBLIC SETTING |
|---|---|---|---|---|
| 48:2C:6A:1E:59:3D | OXYGEN LACK, SLEEPINESS | PRESENTATION, LISTENING (LIGHTS-OUT, LOW VOICE CONVERSATION) | http://10.100.59.76 | TRUE |
| 48:2C:6A:1E:59:3D | OXYGEN LACK, SLEEPINESS | PRESENTATION, LISTENING (LOW LIGHT, LOW VOICE CONVERSATION) | http://10.100.59.76 | TRUE |
| 48:2C:6A:1E:59:3D | OXYGEN LACK, SLEEPINESS | AT BUSINESS (GENERAL LIGHT, LOW VOICE CONVERSATION) | http://10.100.59.76 | TRUE |
| 48:2C:6A:1E:59:3D | OXYGEN LACK, SLEEPINESS | WHILE FILMING (STRONG LIGHT, LOW VOICE CONVERSATION) | http://10.100.59.76 | FALSE |

| GROUP CONTEXT | CONTROLLED DEVICE | CONTROL SIGNAL SETTING |
|---|---|---|
| A | LIGHT, AUDIO VOLUME, VENTILATOR | ....... |
| B | ....... | ....... |
| ....... | ....... | ....... |

| NETWORK REGISTRATED DEVICE | PLACE | AVAILABILITY |
|---|---|---|
| LIGHT | CURRENT PLACE | AVAILABILITY |
| LIGHT | ANOTHER PLACE | AVAILABILITY |
| AUDIO VOLUME | CURRENT PLACE | UNAVAILABILITY |
| VENTILATOR | NO REGISTRATED DEVICE | UNAVAILABILITY |

1800

US 10,764,733 B2

WEARABLE APPARATUS, MANAGEMENT SERVER, MANAGEMENT SYSTEM HAVING THE SAME, AND METHOD FOR CONTROLLING THEREOF

PRIORITY

This application claims priority under 35 U.S.C. § 119(a) to Korean Patent Application No. 10-2014-0187244, filed on Dec. 23, 2014, in the Korean Intellectual Property Office, the entire disclosure of which is incorporated herein by reference.

BACKGROUND

1. Field of the Invention

The present disclosure relates generally to a wearable apparatus, a management server, a management system having the same, and a method for controlling thereof, and more particularly, to a wearable apparatus capable of controlling a common device based on emotion information collected from a plurality of wearable apparatuses, a management server, a management system having the same, and a method for controlling thereof.

2. Description of the Related Art

Recent developments in computer technologies have introduced wearable computers, such as those provided on clothing to be worn by users. A wearable computer is a computer in which a personal computer (PC) function is included in clothing and/or a wearable accessory. Wearable computers are also being developed for military training. Use of these devices has also extended beyond users' everyday lives, to uses including fashion and/or mobile communication, and uses related to digital products.

Recently, biosensors capable of sensing a bio-signal have been installed in wearable computers, and methods of checking emotions of a user based on the bio-signal sensed by such biosensors have been provided.

Methods of providing a service corresponding to a corresponding emotion by using the checked emotion have also been provided. However, in existing methods, a service for a corresponding user is provided based on only an emotion change of one person, and a common service is not provided based on emotion changes of a plurality of users.

For example, if a space such as a subway is crowded with a plurality of users in summertime, the users may commonly feel stressed. In other words, an environment in a particular space and changes in the environment may commonly affect a plurality of users.

Therefore, there is a need for technologies for checking emotions of a plurality of users and providing services appropriate for the plurality of users.

SUMMARY OF THE INVENTION

The present disclosure has been made to address at least the above problems and/or disadvantages and to provide at least the advantages described below.

An aspect of the present invention provides a wearable apparatus capable of controlling a common device based on emotion information collected from a plurality of wearable apparatuses, a management server, a management system having the same, and a method for controlling thereof.

According to an aspect of the present invention, a management server configured to be connected to a plurality of wearable apparatuses and a common device, is provided. The management server includes a communication interface unit configured to receive user environment information from the plurality of wearable apparatuses located in a preset space, an analyzer configured to analyze an environment state of the preset space based on a plurality of pieces of the received user environment information regarding the plurality of wearable apparatuses and determine an operation state of a common device located in the preset space according to the analyzed environment state, and a controller configured to control the communication interface unit so as to operate the common device according to the determined operation state.

According to another aspect of the present invention, a wearable apparatus configured to be connected to a management server is provided. The wearable apparatus includes a communication interface unit configured to transmit to and receive data from the management server, a biosensor configured to collect bio-signal information of a user, an analyzer configured to determine an emotion state of the user based on the collected bio-signal information and generate user environment information based on the determined emotion state, and a controller configured to control the communication interface unit so as to transmit the generated user environment information to the management server.

According to another aspect of the present invention, a management system is provided. The management system includes a common device configured to be located in a preset space, a plurality of wearable apparatuses configured to collect bio-signal information of users and generate user environment information based on the collected bio-signal information, and a management server configured to receive user environment information from the plurality of wearable apparatuses located in the preset space, analyze an environment state of the preset space based on the received user environment information, and control the common device according to the analyzed environment state.

According to another aspect of the present invention, a method of controlling a management server configured to be connected to a plurality of wearable apparatuses and a common device is provided. The method includes receiving user environment information from the plurality of wearable apparatuses located in a preset space, analyzing an environment state of the preset space based on a plurality of pieces of the received user environment information regarding the plurality of wearable devices, determining an operation state of the common device located in the preset space according to the analyzed environment state, and controlling the common device according to the determined operation state.

According to another aspect of the present invention, a non-transitory computer readable recording medium including a program for executing a method of controlling a management server configured to be connected to a plurality of wearable apparatuses and a common device is provided. The method includes receiving user environment information from the plurality of wearable apparatuses located in a preset space, analyzing an environment state of the preset space based on a plurality of pieces of the received user environment information regarding the plurality of wearable devices, determining an operation state of the common device located in the preset space according to the analyzed environment state, and controlling the common device according to the determined operation state.

BRIEF DESCRIPTION OF THE DRAWINGS

The above and/or other aspects, features, and advantages of the present invention will be more apparent by describing certain embodiments of the present disclosure with reference to the accompanying drawings, in which:

FIG. 7 is a diagram illustrating an operation of classifying emotion states according to a pleasantness level and an arousal level according to an embodiment of the present disclosure;

FIGS. 8 and 9 are tables illustrating methods of determining user emotion information through a plurality of pieces of bio-signal information according to an embodiment of the present disclosure;

FIG. 10 is a table illustrating a method of generating user situation information according to an embodiment of the present disclosure;

FIGS. 11, 12A, 12B, and 12C are tables illustrating methods of generating user environment information according to an embodiment of the present disclosure;

FIGS. 14 and 15 are examples of lookup tables used according to a determining whether user situation information is made public according to an embodiment of the present disclosure;

FIGS. 17 and 18 are tables illustrating a method of determining an operation state of a common device according to an embodiment of the present disclosure;

DETAILED DESCRIPTION

Figure 1:
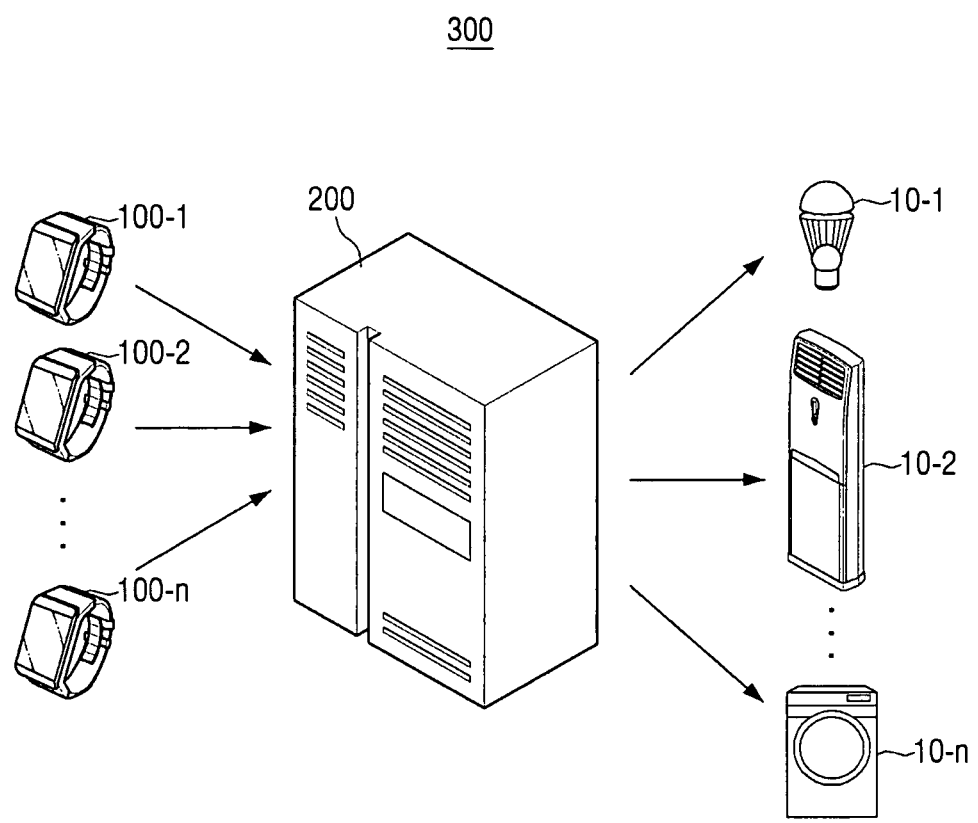
FIG. 1 is a diagram illustrating a configuration of a management system according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms "first", "second", etc. may be used to describe diverse components, but the components are not limited by those terms. The terms are only used to distinguish one component from the others.

The terms used herein the present application are merely used to describe embodiments of the present disclosure, and are not intended to limit the scope of the disclosure. Herein, a singular expression also includes its corresponding plural meaning, as long as the plural meaning does not change the context. Herein, the terms "include" and "consist of" designate the presence of features, numbers, steps, operations, components, elements, or a combination thereof, but do not exclude the presence or possibility of one or more additional features, numbers, steps, operations, components, elements, or a combination thereof.

Herein, a module or a unit performs at least one function or operation, and may be implemented with hardware, software, or a combination of hardware and software. In addition, a plurality of modules or a plurality of units may be integrated into at least one module except for a module or a unit that must be implemented with specific hardware, and may be implemented with at least one processor.

FIG. 1 is a diagram illustrating a configuration of a management system 300 according to an embodiment of the present disclosure;

Referring to FIG. 1, the management system 300 includes a plurality of wearable apparatuses 100, a management server 200, and a plurality of common devices 10.

The plurality of common devices 10 are located in a preset space (i.e., area) and perform preset functions. Here, a common device, in contrast to a device that provides a service to one user, is a home appliance that may provide a common service to a plurality of users. For example, the common device may be a heating, ventilating, and air conditioning (HVAC) device (e.g., a heater, an air conditioner, or the like) that performs a temperature control, a lighting device that performs a brightness control, a speaker, a display apparatus that may provide a particular image, or the like. This common device may support a smart home system (i.e., a home automation system).

The plurality of wearable apparatuses 100-1, 100-2, . . . , and 100-n may respectively collect user bio-signal information and provide the collected user bio-signal information to the management server 200. More specifically, the plurality of wearable apparatuses 100 may respectively generate user environment information indicating user emotions (which may optionally further indicate user sensibility) corresponding to the collected user bio-signal information and provide the generated user environment information to the management server 200. Detailed structures and operations of the wearable apparatuses 100 are described later with reference to FIG. 2.

Herein, a user bio-signal may be a physiological signal that may be measured from a body of a user, i.e., may be an electrocardiogram (ECG), a heart rate variation (HRV), an electromyogram (EMG), a galvanic skin response (GSR), an oxygen saturation (Sp02), a skin temperature, or the like.

The user bio-signal information may be information indicating user emotions checked by the user bio-signal information, a control state of a device that is to be controlled in response to the user emotions, low data (i.e., basic information) (e.g., bio-signal information, location information, schedule information, or the like) used for checking the emotions or the control state, or the like.

The management server 200 may receive user environment information respectively from the plurality of wearable apparatuses 100-1, 100-2, . . . , and 100-*n*, analyze an environment state of a preset location based on the received user environment information, and control the common device 10 based on the analyzed environment state. A detailed structure and operation of the management server 200 is described later with reference to FIG. 4.

The management system 300, according to the embodiment described above, may control a common device in consideration of emotions of a plurality of users, and thus may rapidly and efficiently meet demands of the plurality of users.

As illustrated and described with reference to FIG. 1, the plurality of wearable apparatuses 100 and the common devices 10 are respectively directly connected to the management server 200. However, the plurality of wearable apparatuses 100 and the common devices 10 may be connected to the management server 200 through a user smartphone, a sharer, a router, a wireless internet network, or the like.

As described with reference to FIG. 1, the management server 200 controls, from among common devices, only common devices disposed in one space. However, the management server 200 may control common devices disposed in a plurality of spaces, or a plurality of management servers may respectively control a plurality of common devices disposed in one space.

In addition, the management server 200 controls, from among common devices, only the common devices as described with reference to FIG. 1. However, the management server 200 may control the plurality of wearable apparatuses 100.

The wearable apparatuses 100 directly estimate emotion states and transmit user environment information depending on the estimated emotion states to the management server 200 as shown in FIG. 1. However, the wearable apparatuses 100 may collect only bio-signal information, and the management server 200 may estimate emotion states based on the collected bio signal information. This example is described later with reference to FIG. 4.

In the above-described with reference to FIG. 1, one management server 200 is installed, but a plurality of apparatuses may respectively perform functions of FIG. 1, in accordance with embodiments of the present disclosure.

Also, as described above with reference to FIG. 1, the management server 200 checks a state of a space and controls a common device based on the checked state of the space. However, the management server 200 may evaluate the corresponding space by using the checked state of the space without performing a control operation with respect to an additional common device. An embodiment of the present disclosure consistent with such control operations is described later with reference to FIG. 24.

Figure 2:
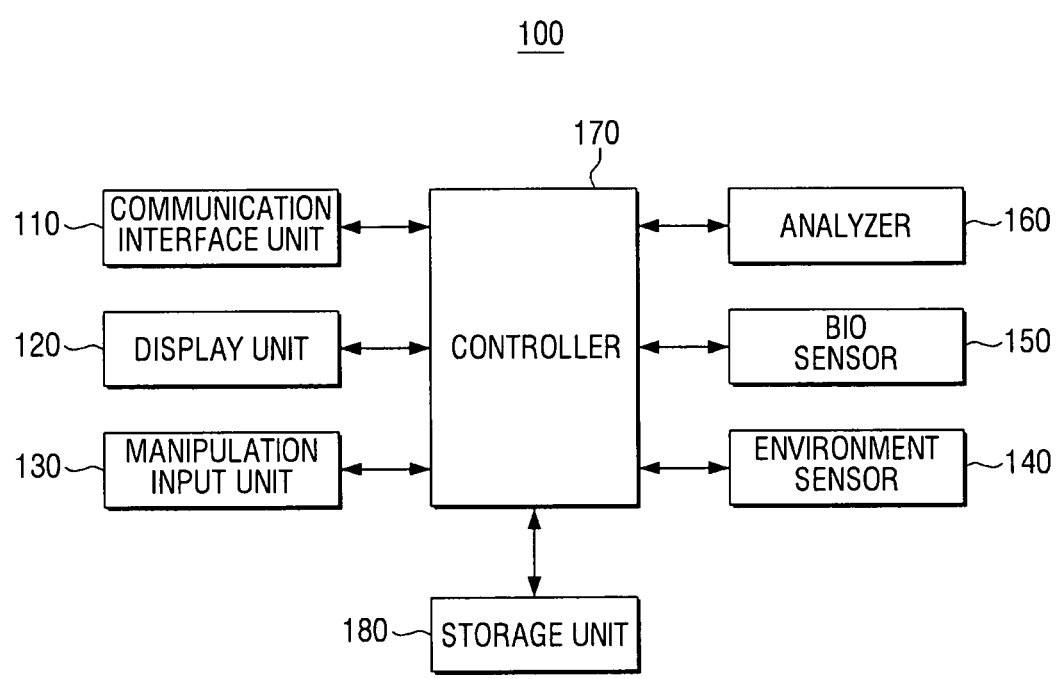
FIG. 2 is a block diagram illustrating a detailed configuration of a wearable apparatus of FIG. 1 according to an embodiment of the present disclosure.

FIG. 2 is a block diagram illustrating a detailed configuration of a wearable apparatus 100 of FIG. 1 according to an embodiment of the present disclosure.

Referring to FIG. 2, the wearable apparatus 100 includes a communication interface unit 110, a display unit 120, a manipulation input unit 130, a storage unit 180, an environment sensor 140, a biosensor 150, an analyzer 160, and a controller 170.

The communication interface unit 110 connects the wearable apparatus 100 to an external apparatus (i.e., a management server). Alternatively, the communication interface unit 110 may be connected to an external apparatus through a local area network (LAN), an internet network, or a wireless communication method (e.g., a wireless communication such as 4-low power wireless personal area network (4LoWPAN), radio frequency identification (RFID), long term evolution device to device (LTE D2D), Bluetooth low energy (BLE), general packet radio service (GPRS), Weightless, Edge Zigbee, ANT+, near field communication (NFC), infrared data association (IrDA), digital enhanced cordless telecommunications (DECT), wireless LAN (WLAN), Bluetooth, Wi-Fi, Wi-Fi Direct, Global System for Mobile Communications (GSM), universal mobile telecommunications system (UMTS), long-term evolution (LTE), wireless broadband (WIBro), or the like).

The communication interface unit 110 may transmit bio-signal information to the management server 200. More specifically, the communication interface unit 110 may transmit bio-signal information sensed by the biosensor 150, which is described later herein, to the management server 200. Alternatively, the communication interface unit 110 may provide user environment information, which is generated based on the bio-signal information, to the management server 200.

The communication interface unit 110 may also receive an operation control command from the management server 200. The operation control command may be a command for performing a particular function of the wearable apparatus 100 or a command for changing an operation state (e.g., a command for a change into a manner mode state (or a silent mode)) of the wearable apparatus 100.

The display unit 120 may display various types of information supported by the wearable apparatus 100. The display unit 120 may include a monitor such as a liquid crystal display (LCD), a cathode ray tube (CRT), or the like, or may include a touch screen that may simultaneously performs functions of the manipulation input unit 130, which is described later herein.

The display unit 120 may display an application list installed in the wearable apparatus 100. The display unit 120 may also display an execution screen for driving an application. For example, the display unit 120 may display a user bio-signal sensed by the biosensor 150, which is described later herein, or an evaluation of the sensed user bio-signal (e.g., a tension state, a pleasantness state, or an emotion state of a current user).

The display unit 120 may also display information indicating whether a location environment of a user is changed and may display a screen for requesting input regarding whether to provide a notification including information about the change in the location environment of the user to the management server 200.

The manipulation input unit 130 may include a plurality of function keys through which the user may set or select various types of functions supported in the wearable apparatus 100. The manipulation input unit 130 may include, for example, a mouse, a keyboard, a microphone, or the like, or may include a touch screen that may simultaneously perform functions of the display unit 120, as described herein above.

The manipulation input unit 130 may receive an application driving command. More specifically, the user may drive an application provided in the wearable apparatus 100 and may receive various types of manipulation commands for an operation in the corresponding application. Such an operation according to an embodiment of the present disclosure may be performed by a particular application.

The manipulation input unit 130 may also receive, from the user, a command for checking whether to transmit the user environment information to the management server 200 (hereinafter referred to as an information transmission command). The information transmission command may be received whenever the user environment information is needed or in a particular environment situation. The user may preset a time when this check is needed. This operation will be described later with reference to FIGS. 14 and 15.

The storage unit 180 stores a program for driving the wearable apparatus 100. In detail, the storage unit 180 may store a program that is a set of various types of commands necessary when driving the wearable apparatus 100. Here, the program includes an application (or an application program) for providing a particular service and an application program for driving the application.

The storage unit 180 also stores user schedule information. The storage unit 180 may store the bio-signal information sensed by the biosensor 150, environment information sensed by an environment sensor, and the user environment information generated by the analyzer 160 that will be described later.

The storage unit 180 may store a reference table (or a lookup table) used to generate user emotion information and user situation information. The storage unit 180 may store a reference table used to determine whether to transmit the generated user environment information.

The storage unit 180 may include, for example, an internal storage medium of the wearable apparatus 100, an external storage medium, a removable disk including a universal serial bus (USB) memory, a web server through a network, or the like.

The environment sensor 140 collects information about the user or a user environment other than the user bio-signal. More specifically, the environment sensor 140 may collect information of a motion of the user or a user surrounding environment through a global positioning system (GPS), a speed and/or acceleration sensor, a motion and/or displacement sensor, a direction and/or location sensor, a gas sensor, a magnetic field sensor, an ultraviolet sensor, an illumination sensor, a vibration sensor, a load sensor, or a sensor, such as a microphone or the like.

The environment sensor 140 also collects user schedule information. In detail, if schedule information of the user is stored in the storage unit 180, the environment sensor 140 may extract a current schedule of the user from the schedule information stored in the storage unit 180. If the schedule information of the user is stored in an external server (or a cloud server), the environment sensor 140 may acquire the user schedule information from the external server by using pre-stored user account information and extract a user schedule corresponding to a current time.

The environment sensor 140 also generates user situation information based on collected information related to an environment of a location of the wearable apparatus 100 and the user schedule information. Detailed operations for generating user situation information are described later herein with reference to FIG. 10.

The biosensor 150 collects the bio-signal information of the user. More specifically, the biosensor 150 may include sensors that may sense an ECG, an EMG a HRV, Sp02, a GSR, a lactic secretion, a blood pressure, a skin temperature, a body composition, a metabolic rate, etc. and may collect the bio-signal information of the user by using the corresponding sensors. This collection operation may be performed in real time, at preset time intervals, or only if a particular event occurs. Here, the particular event may be an event in which a user enters a particular space (e.g., the user takes a bus or goes into a reference hall, i.e., the user goes into a space where a common device is located).

The analyzer 160 determines a user emotion state (which may include, for example, a sensitivity state, a sensitivity change, a sensibility state, or the like) based on the collected bio-signal. In detail, the analyzer 160 may extract a pleasantness level and an arousal level based on the bio-signal information of the user collected by the biosensor 150 and determine one of a plurality of emotion states, which are classified according to the pleasantness and arousal levels, as an emotion state of the user. An operation of the analyzer 160 is described later herein with reference to FIGS. 6 and 7.

The analyzer 160 also generates user environment information of an emotion that the user feels about a current environment. More specifically, the analyzer 160 may generate the user environment information based on previously-determined emotion state and user situation information. Generation of the user environment information is described later with reference to FIGS. 8 through 13.

The controller 170 controls elements of the wearable apparatus 100. In detail, the controller 170 determines whether to notify the management server 200 of the user environment information. For example, if the user enters a new space or an emotion state of the user is rapidly changed, the controller 170 may determine that a notification indicating the user environment information must be sent to the management server 200. However, the controller 170 may receive, before the notification is sent, an input or setting indicating whether to transmit information, from the user, and may transmit the user environment information according to the input or settings received from the user.

Alternatively, the controller 170 may determine whether to send a notification of the user environment information according to a pre-stored condition (e.g., as shown and described later herein with reference to FIGS. 14 and 15). More specifically, the controller 170 may selectively determine whether to transmit the information, according to a reference table corresponding to a condition preset by the user. The selection options may include transmission, non-transmission, and check for corresponding input or settings from a user. For example, a transmission may be performed, without checking for input or settings from a user, in a condition classified as an emergency situation. As another example, an additional transmission may not be performed in a situation where the emergency situation is changed into a normal situation, and a transmission may be performed according to user check items in a condition in which a location of the user has changed.

Also, if the transmission or the nontransmission of the information is pre-stored according to a plurality of conditions, the controller 170 may determine whether to transmit the user environment information, based on the pre-stored conditions.

The controller 170 may also control the environment sensor 140, the biosensor 150, and the analyzer 160 to generate the user environment information in real time, or at preset time intervals. The controller 170 may control the communication interface unit 110 to notify the management server 200 of the generated user environment information. In this situation, the controller 170 may not provide other information (e.g. a name, an address, a phone number, a resident registration number, etc. of the user) for recognizing the user.

If an operation control command is input through the communication interface unit 110, the controller 170 may control the elements of the wearable apparatus 100 to perform an operation according to the input operation control command. For example, if the wearable apparatus 100 has a sound alarm function or a vibration notification function, and an operation control command for changing into a focus mode (or an operation control command for changing into a nonalarm mode is input from the management server 200, the controller 170 may control not to generate a sound alarm or vibrations according to the event that is currently occurring.

As described above, the wearable apparatus 100, according to an embodiment of the present disclosure, may provide the management server 200 with bio-information necessary for checking emotion information or an emotion of each user. The wearable apparatus 100, according to an embodiment of the present disclosure, may transmit information indicating the emotion while excluding information associated with personal information, or may transmit user environment information only if the user approves of the transmission. Therefore, unnecessary leaks of personal information may be prevented.

Although the biosensor 150 and the environment sensor 140 are shown and described as separate elements with reference to FIG. 2, these sensors may be realized as one sensor in accordance with embodiments of the present disclosure. Similarly, although the analyzer 160 and the controller 170 are shown and described as separate elements, functions of the analyzer 160 and functions of the controller 170 may be performed by a single element.

In the present example according to an embodiment of the present disclosure, the environment sensor 140 has been described as generating user situation information. However, the environment sensor 140 may merely collect information associated with an environment by using various types of sensors, and the analyzer 160, which is described later herein, may acquire schedule information and generate user situation information.

Figure 3:
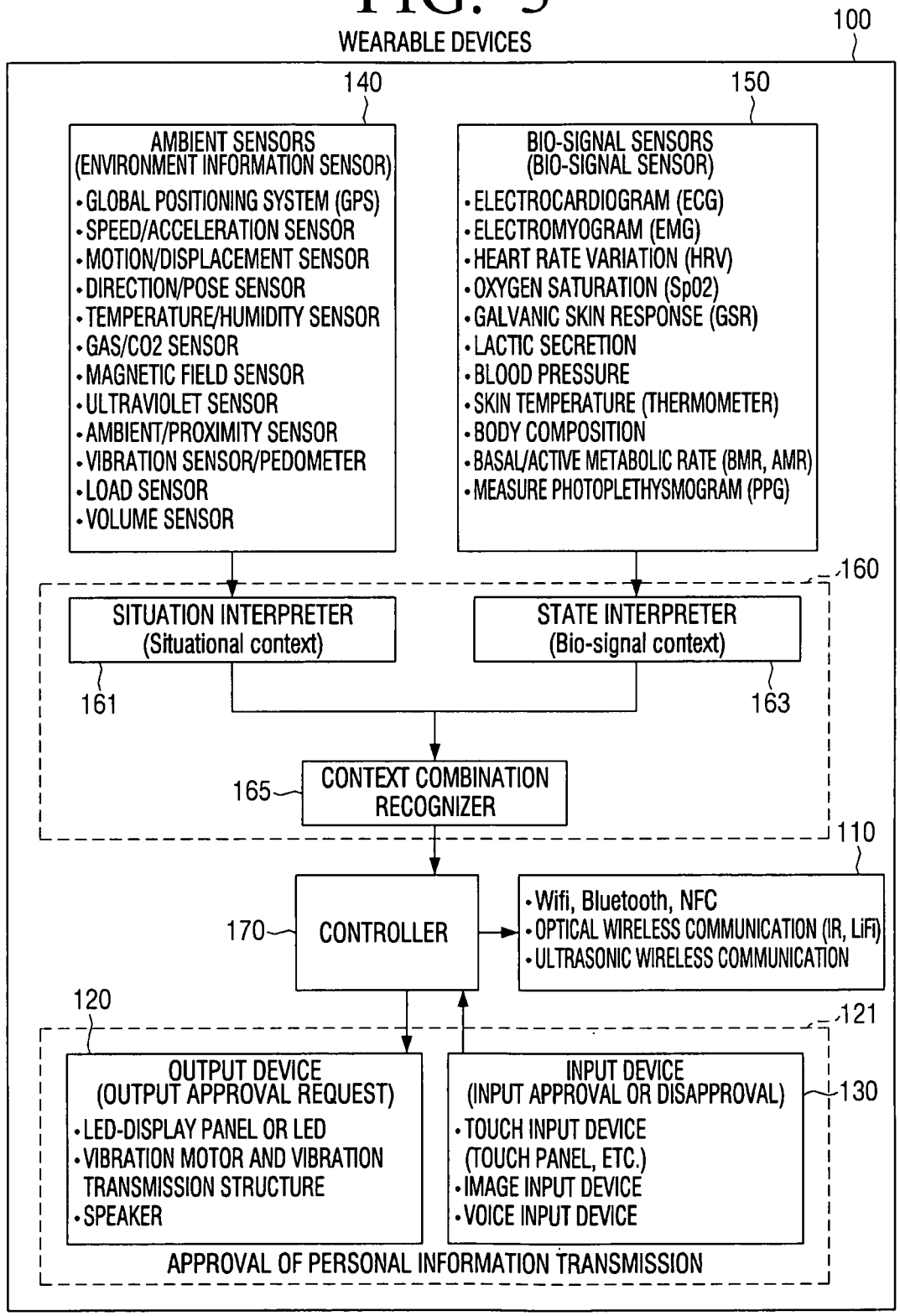
FIG. 3 is a block diagram illustrating a detailed configuration of an analyzer of FIG. 2 according to an embodiment of the present disclosure.

FIG. 3 is a block diagram illustrating a detailed configuration of the analyzer 160 of FIG. 2 according to an embodiment of the present disclosure.

Referring to FIG. 3, the wearable apparatus 100 includes the transceiver 110, an output device 120, a user interface unit 121, an input device 130, the environment sensor 140, the biosensor 150, the analyzer 160, and the controller 170.

The communication interface unit 110, the user interface unit 121, the environment sensor 140, the biosensor 150, and the controller 170 perform the same functions as the corresponding elements of FIG. 2, and thus repeated descriptions of these elements are omitted herein for clarity and conciseness.

The analyzer 160 may generate user environment information based on various types of collected bio-signal information and user situation information. The analyzer 160 may include a situation interpreter 161, a state interpreter 163, and a context combination recognizer 165.

The situation interpreter 161 may generate user situation information based on signals sensed by various types of sensors of the environment sensor 140. For example, the situation interpreter 161 may be provided with position information of a user, a schedule of the user, and information about an illuminance, noise, etc. in a space where the user is located, from the environment sensor 140 as shown in FIG. 10 and generate a situation code, which is user situation information, based on the location information of the user, the schedule of the user, and the information about the illuminance, the noise, etc.

The state interpreter 163 may generate user emotion information indicating an emotion state of the user based on signals sensed by various types of sensors of the biosensor 150. For example, the state interpreter 163 may be provided with physical signals, which are sensed by an ECG sensor, an HRV sensor, and a skin temperature sensor, from the biosensor 150 as shown in FIG. 8 and determine a pleasantness level and a tension level of the user based on the physical signals. The state interpreter 163 may determine an emotion (or a mentality) of the user based on the determined pleasantness and tension levels. Also, the state interpreter 163 may determine a state code by additionally using other physical signals (EMG, GSR, Sp02, etc.) other than the ECG, the HRV, and the skin temperature. This determination is described in detail later with reference to FIGS. 8 and 9.

The context combination recognizer 165 generates a personal context (i.e., user environment information) based on the situation code and the state code. More specifically, the context combination recognizer 165 may determine a personal context corresponding to the situation code determined by the situation interpreter 161 and the state code determined by the state interpreter 163 by using a reference table corresponding to the state code and the situation code as shown in FIG. 11. Here, the personal context refers to an environment state required for the user or may refer to a control state of a particular device for a corresponding environment state. For example, the personal context for a sleepy state may be expressed as a ventilation function, a light brightness increase, or the like for resolving the corresponding sleepy state.

Here, the context combination recognizer 161 may consider an experimental value of a first determined state code, i.e., may perform a verification procedure, to determine a final personal context. This operation is described later with reference to FIGS. 11 through 13.

Figure 4:
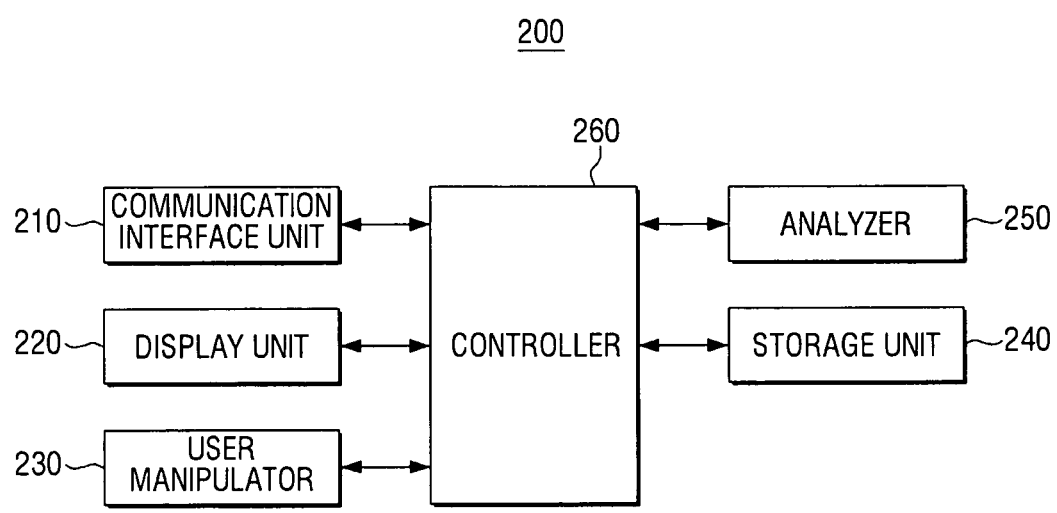
FIG. 4 is a block diagram illustrating a detailed configuration of a management server of FIG. 1 according to an embodiment of the present disclosure.

FIG. 4 is a block diagram illustrating a detailed configuration of the management server 200 of FIG. 1 according to an embodiment of the present disclosure.

Referring to FIG. 4, the management server 200 includes a communication interface unit 210, a display unit 220, a user manipulator 230, a storage unit 240, an analyzer 240, and a controller 260.

The communication interface unit 210 connects the management server 200 to an external apparatus (e.g., a plurality of wearable apparatuses, a common device, or the like). The communication interface unit 210 may also be connected to the external apparatus through a LAN, an internet network, and/or a wireless communication method (e.g., a wireless communication method such as Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, WiBRO, or the like).

The communication interface unit 210 may receive bio-signal information of each user from the wearable apparatus 100. More specifically, the communication interface unit 210 may receive bio-signal information collected by the plurality of wearable apparatuses 100. Alternatively, the communication interface unit 210 may receive user environment information, which is generated based on the bio-signal information, from each of the wearable apparatuses 100.

The communication interface unit 210 may also provide an operation control command. More specifically, the communication interface unit 210 may transmit the determined operation control command to the common device 10 according to a determination of the controller 260, which is described later herein. The communication interface unit 210 may transmit the operation control command even to the wearable apparatus 100 besides the common device 10.

The display unit 220 may display various types of information supported in the management server 200. The display unit 220 may be a monitor such as an LCD, a CRT, or the like or may include a touch screen that may simultaneously perform functions of the user manipulator 230.

The display unit 220 may display an environment state of a particular space that is a result analyzed by the analyzer 250, which is described later herein, or may display an operation state of a common device.

The user manipulator 230 includes a plurality of function keys through which a user may set or select various types of functions supported in the management server 200. The user manipulator 230 may be realized as a unit such as a mouse, a keyboard, a microphone, or the like or as a touch screen that may simultaneously perform a function of the display unit 220.

The user manipulator 230 may receive a selection of a space to which a control according to an embodiment of the present disclosure will be applied. For example, if a plurality of common devices respectively located in a plurality of spaces can be controlled by the management server 200, the user manipulator 230 may receive a selection of one of the plurality of spaces where control of a common device will be performed.

The storage unit 240 stores a program for driving the management server 200. The storage unit 240 also stores user environment information respectively received from a plurality of wearable apparatuses. The storage unit 240 may also store a controlled device corresponding to an environment state (or a group context) and a reference table (or a lookup table) for a control signal.

The storage unit 240 may include an internal storage medium of the management server 200 or an external storage medium, e.g., may include a removable disk including a USB memory, a web server through a network, or the like.

The analyzer 250 analyzes an environment state of a preset space based on received information about a plurality of users and determines an operation state of a common device located in the preset space according to the analyzed environment state. In detail, the analyzer 250 divides locations of wearable apparatuses into preset space units and determines an environment state of a corresponding space based on user environment information received from wearable apparatuses located in the divided space units. For example, if ten wearable apparatuses are located in one space, and user contexts received from eight wearable apparatuses are context codes corresponding to a focus state, the analyzer 250 may determine that a corresponding state is a focus state.

If low data (e.g., bio-signal information, location information, schedule information, or the like) is received as user environment information, the analyzer 250 determines emotion states of users of a plurality of wearable apparatuses based on the received bio-signal information. The analyzer 250 may also generate user environment information about an emotion that a user currently feels about an environment, based on a determined home state.

The analyzer 250 determines an operation state of a common device located in a determined space according to an analyzed environment state. In detail, the analyzer 250 may determine an operation state of a common device corresponding to the analyzed environment state by using a lookup table stored in the storage unit 240.

The controller 260 controls elements of the management server 200. More specifically, if user environment information is received from a plurality of wearable apparatuses 100, the controller 260 may control the analyzer 250 to analyze an environment state of a preset space according to the received user environment information. The controller 260 may also control the analyzer 250 to determine an operation state of a common device according to an analyzed environment state and control the communication interface unit 210 to operate the common device according to a determined operation state.

The management server 200, according to the above-described embodiment of the present disclosure, may check an environment state of a corresponding space based on user environment information received from the plurality of wearable apparatuses 100. Therefore, the management server 200 may adaptively control a common device located in the corresponding space.

Although the analyzer 250 and the controller 260 are shown and described as separate elements with reference to FIG. 4, a single element may perform functions of the analyzer 250 and functions of the controller 260 in accordance with embodiments of the present disclosure.

Figure 5:
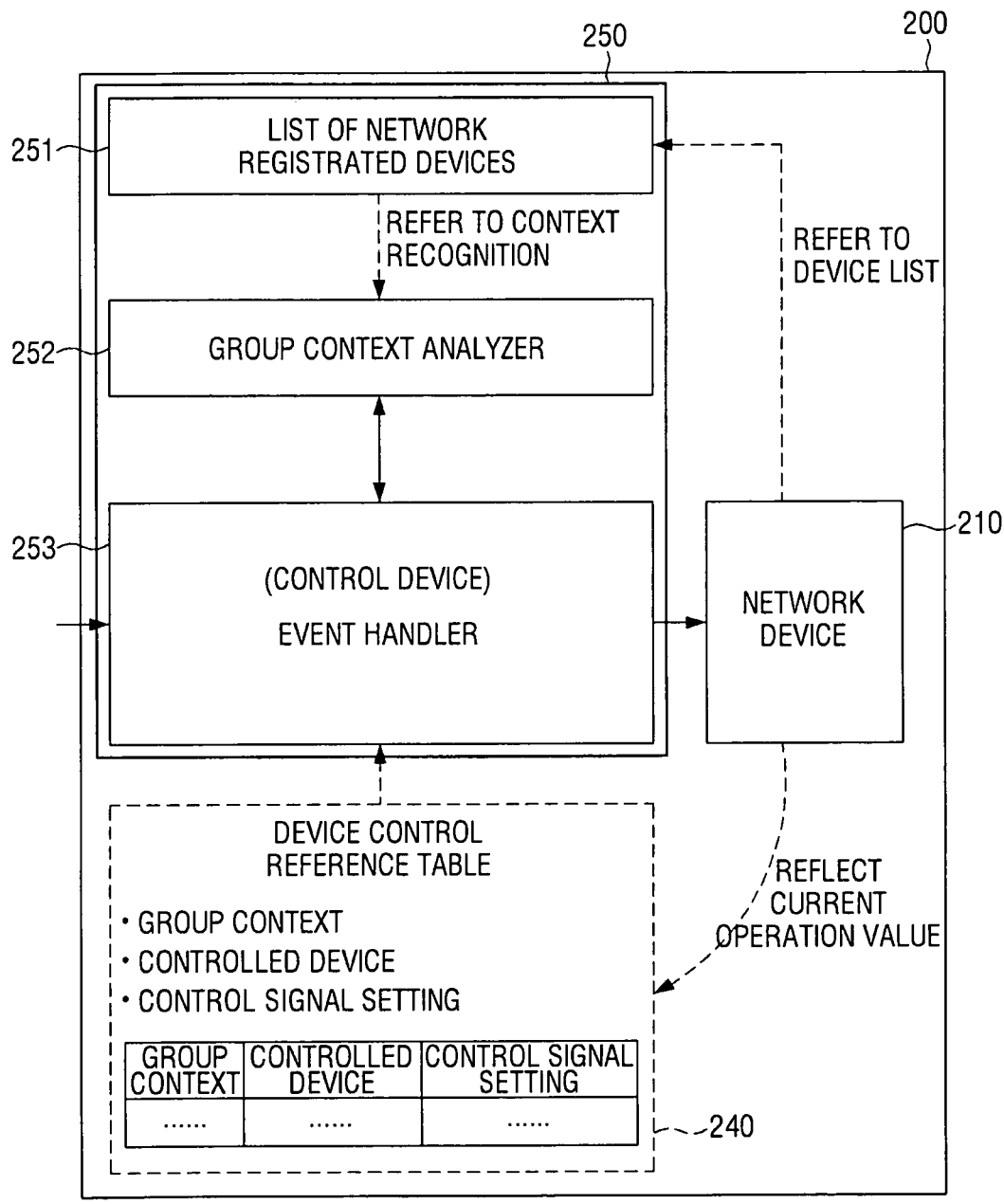
FIG. 5 is a block diagram illustrating a detailed configuration of an analyzer of FIG. 4 according to an embodiment of the present disclosure.

FIG. 5 is a block diagram illustrating a detailed configuration of the analyzer 250 of FIG. 4 according to an embodiment of the present disclosure.

Referring to FIG. 5, the management server 200 includes the communication interface unit 210, the storage unit 240, and the analyzer 250.

Operations of the communication interface unit 210 and the storage unit 240 are the same as the operations of the communication interface unit 210 and the storage unit 240 of FIG. 4, and thus repeated descriptions of these elements is omitted for clarity and conciseness.

The analyzer 250 may check a state of a space where a plurality of wearable apparatuses are located and determine a control state of a common device located in the checked space. The analyzer 250 includes a device manager 251, a context analyzer 252, and an event handler 253.

The device manager 251 may identify wearable apparatuses located in a preset space and acquire user environment information respectively received from the wearable apparatuses.

Figure 16:
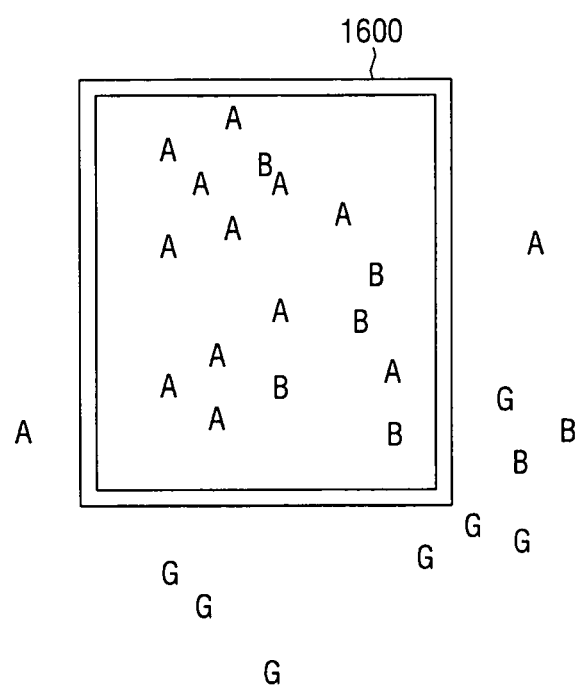
FIG. 16 is a diagram illustrating a method of using user environment information in a preset space according to an embodiment of the present disclosure.

The context analyzer 252 may analyze a situation state of a corresponding space, based on the user environment information respectively received from the wearable apparatuses 100. For example, if a particular context A outnumbers other contexts in a preset space as shown in FIG. 16, the context analyzer 252 may analyze the particular context A as a state of the corresponding space. For example, a first context may be considered as outnumbering a second context, if the first context is greater than the second context by at least a preset ratio (e.g., 50%).

If a plurality of contexts are compatible, the context analyzer 252 may analyze a corresponding space with a plurality of contexts. If a context A is a light change, a context B is an air conditioner operation, and both of the contexts A and B have a ratio higher than or equal to 30%, the context analyzer 252 may determine, as a result of an analysis, that a light change operation and an air conditioner operation are both needed.

Also, the event handler 253 may determine an operation state of a common device located in a preset space according to an environment state analyzed based on a device control reference table stored in the storage unit 240. The determined operation state of the common device may be provided to the corresponding common device through the communication interface unit 210.

Figure 6:
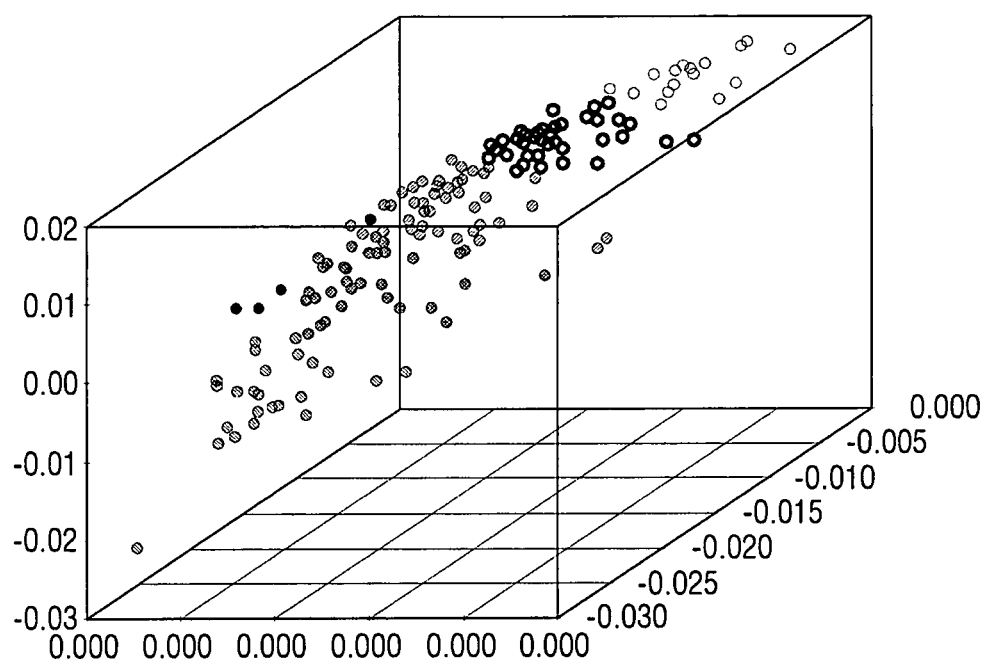
FIG. 6 is a diagram illustrating a pattern of bio-signal information input from a plurality of sensors according to an embodiment of the present disclosure.

FIG. 6 is a diagram illustrating patterns of bio-signal information input from a plurality of sensors according to an embodiment of the present disclosure.

Referring to FIG. 6, ECG, HRV, and skin temperature values are displayed on a 3-dimensional (3D) coordinate at a plurality of time points. As shown on a corresponding 3D graph, 3 bio-signals (an ECG, an HRV, and a skin temperature) have preset patterns.

A pleasantness level of a human may be measured by using an electroencephalogram (EEG), and a tension level of the human may be measured by using a bio-signal such as an ECG an HRV, a skin temperature, or the like. Since the above-described contents are widely well-known, a method of checking a pleasantness level and a tension level through each bio-signal is omitted. Bio-signals other than the above-described bio-signals may be used in accordance with embodiments of the present disclosure.

FIG. 7 is a diagram illustrating a method of classifying emotion states according to pleasantness and arousal levels according to an embodiment of the present disclosure.

Referring to FIG. 7, the pleasantness and arousal levels may be classified into 3 levels. An emotion of a user may be determined as one of tension (stress), enhancement (liveliness), excitement, sadness (unhappiness), happiness (delight), tiredness (exhaustion, depression), sleepiness, and calmness (laziness), according to the pleasantness and arousal levels.

FIGS. 8 and 9 are tables illustrating methods of determining user emotion information through a plurality of pieces of bio-signal information according to embodiments of the present disclosure. FIG. 8 illustrates an example of a lookup table indicating user emotion states corresponding to bio-signals according to an embodiment of the present disclosure. FIG. 9 illustrates an example of user state codes depending on emotion states and additional bio-signals according to an embodiment of the present disclosure.

Referring to FIG. 8, the lookup table includes state values of pleasantness and arousal respectively corresponding to three pieces of bio-signal information and user emotion state values corresponding to the pleasantness and arousal levels. The lookup table of FIG. 8 is formed of a combination of FIGS. 6 and 7, and thus includes items of the pleasantness and arousal levels. However, pleasantness and arousal areas of the items may be omitted from the lookup table of FIG. 8.

Referring to FIG. 9, a second lookup table includes state codes corresponding to values respectively corresponding to a user state, an EMG, a GSR, and a Sp02. For example, in order to check what causes (or indicates) a sleepy state of a user, state codes may be classified into oxygen lack (i.e., an environment change) and drowsiness (i.e., a user's will) by using values of EMG, GSR, and Sp02.

As described above with reference to FIGS. 8 and 9, state codes of a user may be generated by using 2 lookup tables. However, the lookup table of FIG. 8 may be used without the lookup table of FIG. 9 or a lookup table that includes state codes corresponding to values of an ECG, an HRV, a skin temperature, an EMG, a GSR, and a Sp02 may be used.

FIG. 10 is a table illustrating a method of generating user situation information according to an embodiment of the present disclosure.

Referring to FIG. 10, a third lookup table 1020 is an example of a lookup table for determining situation codes. In detail, the third lookup table 1020 includes situation code values corresponding to values of schedules, illuminances, and noise.

For example, if a user schedule corresponding to a current time is a schedule e of a business conference, a current illuminance is lower than or equal to thirty lx, and noise is less than or equal to thirty dB in user schedule information 1010, a situation code may be determined that a user listens in a business conference process.

However, if the illuminance is less than or equal to 30 lx, and the noise is at least equal to 30 dB, the determined situation code may correspond to a user giving a presentation in the business conference process. Alternatively, if the illuminance is at least equal to three-hundred lx, and the noise is less than or equal to thirty dB, the determined situation code may correspond to a user conducting normal business.

In the above-described example, a situation code is determined by using three values of (1) schedule, (2) illuminance, and (3) noise. However, the situation code may be determined by using two or fewer values or other conditions may be further added besides 3 conditions described above to determine the situation code.

FIGS. 11, 12A, 12B, and 12C are diagrams illustrating a method of generating user environment information according to an embodiment of the present disclosure. In detail, FIG. 11 illustrates an example of a fourth lookup table used to generate user environment information. FIGS. 12A through 12C illustrate an example of a fourth lookup table in a conference situation.

Referring to FIGS. 11, 12A, 12B, and 12C, a fourth lookup table 1100 is a reference table including personal context values corresponding to a state code and a situation code.

For example, as shown in table 1210 FIG. 12A, if a user listens in during a business conference, or the user is sleepy due to a lack of fresh air, the user may provide ventilation appropriate for the level of concentration required for the business conference or the user may promote an environment for concentrating business by raising a light (i.e., increasing a brightness or illuminance of a space).

As shown by table 1220 of FIG. 12B, in order to verify whether a manipulation such as raising a brightness of a light is substantially necessary, situation information corresponding to a manipulated common device may be additionally verified, and thus final user environment information may be determined. More specifically, if the illuminance and oxygen are re-measured, and actual oxygen level is deemed insufficient, an operation of a common device capable of performing a ventilation may be initiated. Also, if the illuminance is actually dark (i.e., insufficient), an operation of increasing a brightness of the light may be performed. This operation of verifying and adjusting environment conditions is described in more detail with reference to FIG. 13.

Through this verification of environment conditions, a personal context as shown in FIG. 12A may be determined as a final personal context as shown in table 1230 of FIG. 12C.

Figure 13:
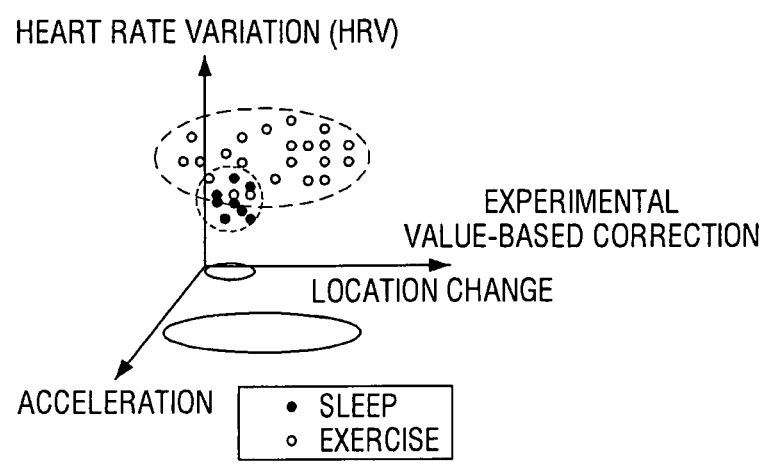
FIG. 13 is a diagram illustrating an operation of finally determining user environment information based on an experimental value according to an embodiment of the present disclosure.

FIG. 13 is a diagram illustrating a method of determining final user environment information based on an experimental value.

Referring to FIG. 13, a range of HRV that correspond to a sleepy state and a range of HRV that correspond to an exercise state have areas that overlap each other. Therefore, if the sleepy state and the exercise state are determined according to an HRV, a person who is exercising may be determined as being in a sleepy state; and a person who is sleeping may be determined as being in an exercise state.

However, a location change and an acceleration change in the sleepy state and the exercise state differ from each other. For example, there are little location change and little acceleration change when a user is in a sleepy state, but the location change and the acceleration change are considerably larger when the user is in an exercise state.

Therefore, predetermined user environment information that may be corrected by using actual values such as the acceleration change, the location change, or the like. For example, as shown in FIGS. 12A through 12C, when a user is determined to be in a sleepy state, and a current state may also be determined as a state requiring additional ventilation, such as when listening to a presentation. However, if the location change and the acceleration change of the user are large, the determination of a user's current state may be corrected as the exercise state instead of the sleepy state.

FIGS. 14 and 15 lookup tables used in methods of determining whether to make public user situation information according to an embodiment of the present disclosure.

Referring to FIGS. 14 and 15, a fourth lookup table 1400, 1500 in FIGS. 14 and 15 respectively, includes values of a situation code, a state code, an address of a corresponding transmission server, and a public setting. For example, if the user is in an oxygen lack state (i.e., has an oxygen level below a predetermined value) and is in a business conference situation, a corresponding value may include a public value that is transmitted to the management server 200. Also, if the user is in the oxygen lack state or in a filming situation where, for example, filming a presenter, the corresponding value may have a public value (a false value) that is not transmitted to the management server 200.

FIG. 16 is a diagram illustrating a method of using user environment information in a preset space according to an embodiment of the present disclosure.

Referring to FIG. 16, the management server 200 displays collected user environment information in response to a location of a corresponding wearable apparatus.

If the management server 200 collects types of user environment information of each user in a preset space, and as illustrated in the example, if a situation A is the majority in the preset space and situations B and G are the minority, the management server 200 may control a common device corresponding to the situation A. For example, if the situation A is a ventilation and/or light up situation, the management server 200 may control a common device capable of performing a ventilation in a preset space 1600 to perform the ventilation and may increase a brightness of a light in the preset space.

FIGS. 17 and 18 are tables illustrating methods of determining an operation state of a common device according to an embodiment of the present disclosure.

Referring to FIG. 17, a fifth lookup table 1700 includes values of controlled devices corresponding to context values and value of control signals of the controlled devices. For example, since a context A occupies the preset space 1600 as shown in FIG. 16 more than other contexts, the management server 200 may determine the corresponding group context as A and may respectively control a light, an audio volume, and a ventilator corresponding to an item A of the fifth lookup table 1700 of FIG. 17.

FIG. 18 is a table illustrating an example of information of a common device registered in a management server according to an embodiment of the present disclosure.

Referring to FIG. 18, a sixth table 1800 includes common devices controllable by the management server 200, location information of each of the common devices, information about whether the common devices are usable (i.e., available) at particular spaces (i.e., locations). The information in the sixth table 1800 may be used in conjunction with fifth lookup table 1700 to send control signals only to available devices for a particular space.

FIGS. 19 through 24 are diagrams illustrating examples of methods performed depending on various types of environments according to an embodiment of the present disclosure.

Figure 19:
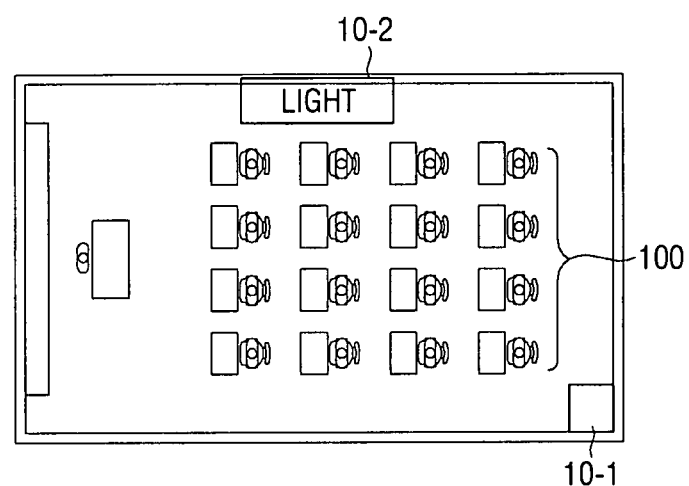
FIGS. 19 through 25 are diagrams illustrating examples of methods performed according to various environments according to an embodiment of the present disclosure.

FIG. 19 is a diagram illustrating an example of a method performed in a classroom.

Referring to FIG. 19, a light 10-2 and an air conditioner 10-1 are disposed as common devices in the classroom.

If a lot of students in the classroom are sleepy, a light in a corresponding space is dark (i.e., an illuminance level is relatively low), and a temperature is high in the classroom environment, the wearable apparatuses 100 of the students may transmit personal contexts, indicating that the light is to be turned on, and an air conditioner capacity is to be increased, to the management server 200.

If number of devices transmitting the personal contexts is at least equal to a preset number, the management server 200 may control the light 10-2 to increase brightness and may control the air conditioner 10-1 to increase an air volume.

Figure 20:
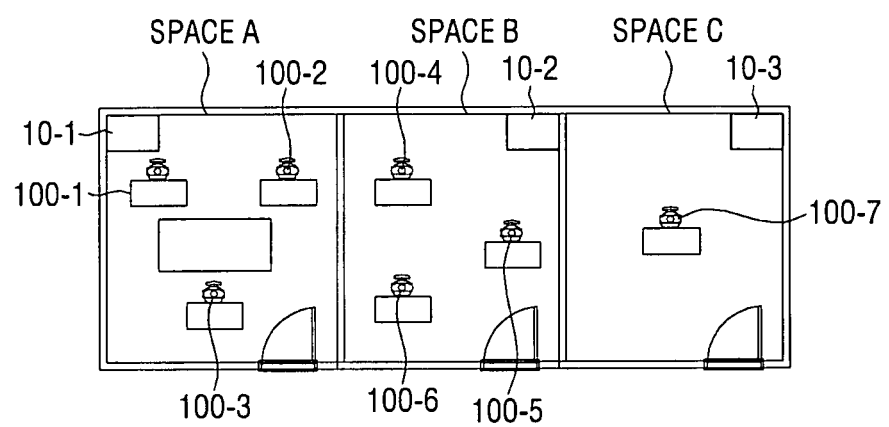

FIG. 20 is a diagram illustrating an example of a method in an environment having a plurality of conference spaces.

Referring to FIG. 20, ventilators 10-1, 10-2, and 10-3 are respectively disposed in the conference spaces. Also, the management server 200 is connected to seven wearable apparatuses.

In this conference environment, the management server 200 may collect user environment information of each of the seven wearable apparatuses. Here, the management server 200 may classify spaces of the seven wearable apparatuses and consider user environment information of each of the spaces.

For example, the management server 200 may control the ventilator 10-1 in consideration of only user environment information of three users 100-1, 100-2, and 100-3 located in space A. Also, the management server 200 may control the ventilator 10-2 in consideration of only user environment information of three users 100-4, 100-5, and 100-6 located in space B. Also, the management server 200 may control the ventilator 10-3 in consideration of only user environment information of one user 100-7 located in a space C.

Figure 21:
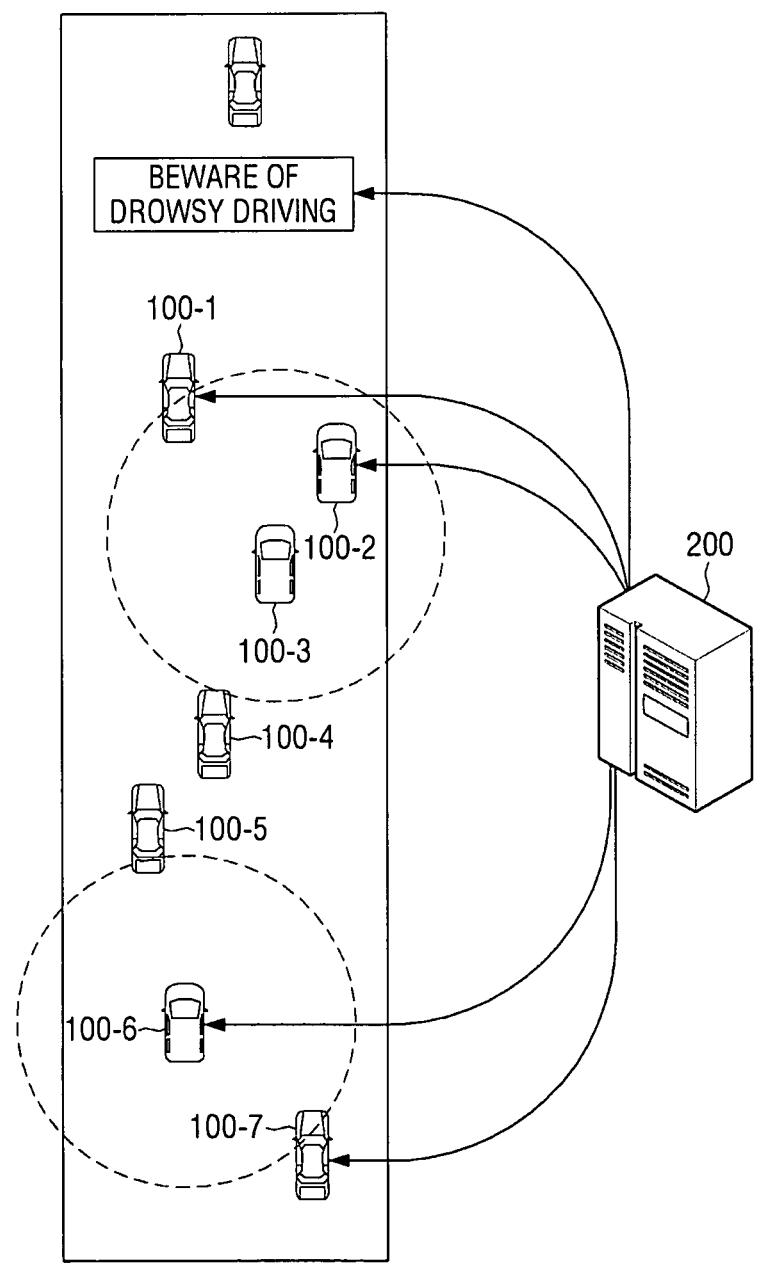

FIG. 21 is a diagram illustrating an example of a method in an expressway environment according to an embodiment of the present disclosure.

Referring to FIG. 21, seven vehicles are currently moving, and thus the management server 200 may acquire user environment information from drivers of the seven vehicles.

The management server 200 may determine whether a user is driving while drowsy and whether the user is driving recklessly, from the acquired information. For example, if a user is silent or drowsy due to a low skin tension level and a low oxygen saturation, the corresponding user may be determined as driving while drowsy. Also, if a moving speed of a user is faster than a regulated speed, an acceleration change is high, and a blood pressure and a heart rate of the user are higher than a reference value, the corresponding user may be determined as driving recklessly.

The management server 200 may also control to display a warning message corresponding to collected information on a display apparatus. For example, if a second user 100-2 is determined as driving while drowsy, the management server 200 may display a warning message "careful driving" at a time when the second user 100-2 is able to see the display apparatus. The management server 200 may also transmit a control command to display a "beware of drowsy driving" message on the wearable apparatus 100-2 of the corresponding user and display a "defensive driving" message to surrounding users 100-1 and 100-3 of the corresponding user 100-2.

If it is determined that a sixth driver 100-6 is speeding, the management server 200 may transmit a control command to display a reckless driving warning message on the display apparatus and display the reckless driving warning message on a wearable apparatus of the sixth driver 100-6. The management server 200 may display a defensive driving message to surrounding users 100-5 and 100-7 of the corresponding user 100-6.

Figure 22:
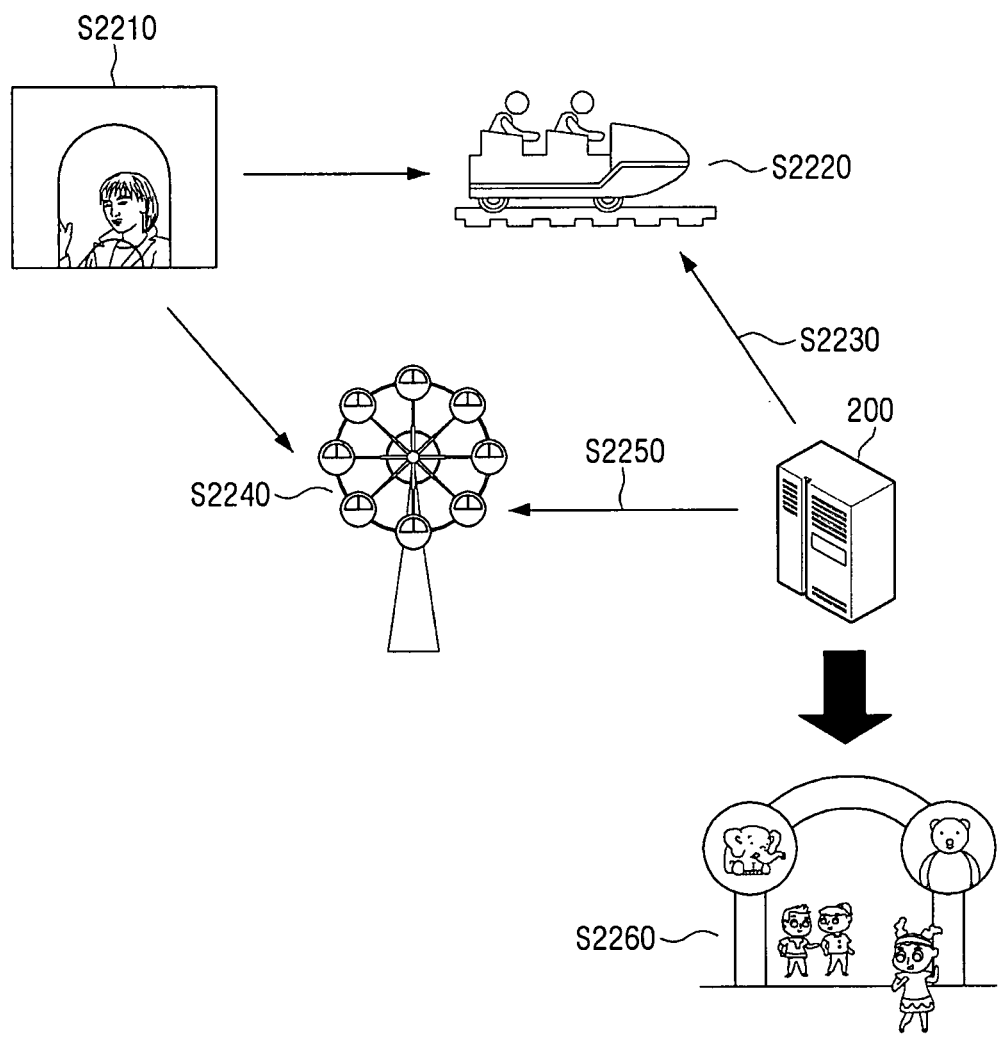

FIG. 22 is a diagram illustrating an example of a method in an amusement park environment according to an embodiment of the present disclosure.

Referring to FIG. 22, if a user passes through an entrance of an amusement park, the management server 200 communicates with a wearable apparatus 100 of the user, in step S2210. Therefore, emotion information of each user may be transmitted to the management server 200 of the corresponding amusement park.

If the user rides a particular ride at the amusement park, the management server 200 measures emotion changes of the user on the corresponding ride. The management server 200 determines responses to each corresponding ride according to the provided emotion changes in steps S2220 and S2240.

In steps S2230 and 2250, the management server 200 may control to vary a movement of each respective ride according to the determined response. For example, if HRVs and skin tensions of most passengers who ride on the corresponding ride increase to a high value, the corresponding ride may be determined as having a high response, and a manipulation of reducing a play time, etc., may be performed. Also, if the HRVs and the skin tensions of the passengers of a particular ride are urgently changed or correspond to abnormal states, the management server 200 may stop an operation of the ride.

If the user passes the entrance of the corresponding amusement park while exiting the park, the management server 200 terminates a connection to the wearable apparatus 100, and the wearable apparatus 100 stops transmitting user environment information to the management server 200, in step S2260.

Figure 23:
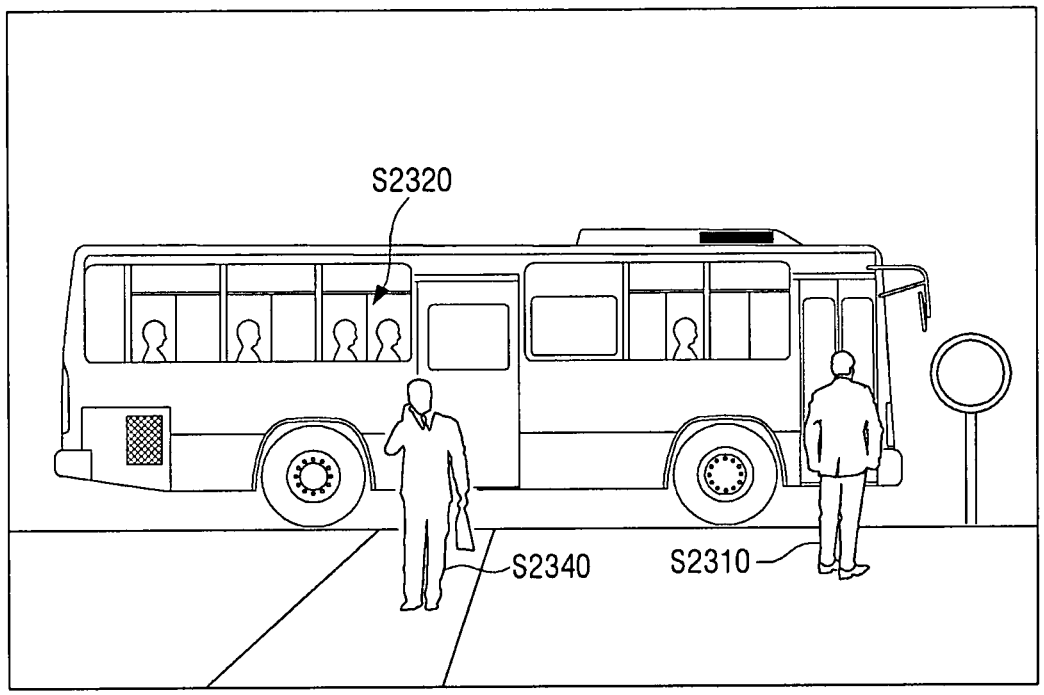

FIG. 23 is a diagram illustrating an example of a method in a bus ride environment according to an embodiment of the present disclosure.

Referring to FIG. 23, a user rides on a bus, a wearable apparatus 100 of the user is registered in the management server 200 in response to a tag operation to pay bus fare, and user environment information of the user is transmitted, in step S2310.

User environment information of users who ride on a bus is transmitted to the management server 200, and thus, if the users are determined to be sleepy, the management server 200 controls an air conditioner in the bus to operate, in step S2320. Alternatively, if most of passengers in the bus are stressed due to a reckless driving state of the bus, the management server 200 may display a message to a driver of the bus that instructs the driver to drive safely.

If the user who rides on the bus gets off the bus, a connection of a wearable apparatus of the user to the management server 200 is terminated, in step S2340.

Figure 24:
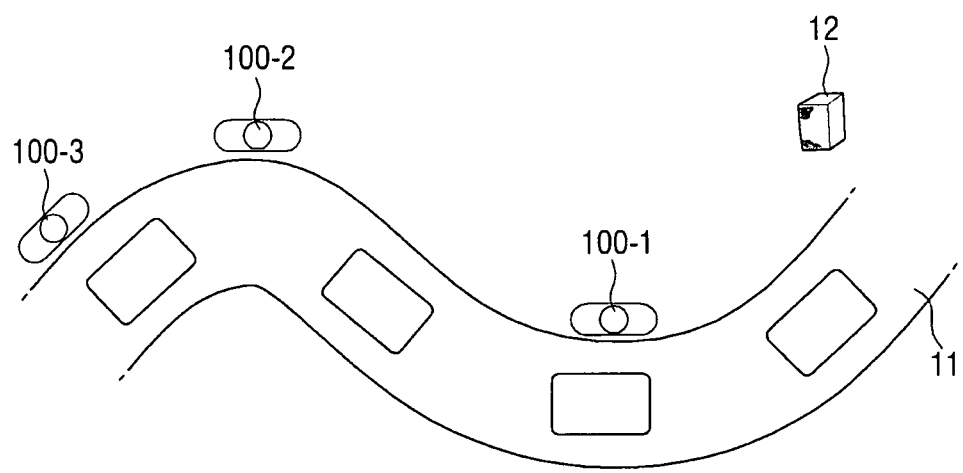

FIG. 24 is a diagram illustrating an example of a method performed in a factory environment according to an embodiment of the present disclosure.

Referring to FIG. 24, a conveyer belt 11 and a speaker 12 are disposed as common devices in the factory environment.

In this factory environment, several workers 100-1, 100-2, and 100-3 perform jobs allocated to the workers 100-1, 100-2, and 100-3 in their respective locations.

In a job environment using a conveyer belt, workers organically move, and thus all of the workers need to perform their jobs at the same speed. Therefore, all of the workers may perform their jobs according to a job speed set to default regardless of their job efficiencies.

However, a worker is having difficulty in maintaining a consistent speed, it becomes difficult for all of the workers to perform their respective jobs at the same speed. Therefore, a conveyer belt may be adjusted to a lowest speed.

However, in the present example according to embodiment of the present invention, a concentration, etc. of each worker may be checked. Therefore, a job speed may be adaptively adjusted by using a concentration and a fatigue of each worker.

More specifically, wearable apparatuses of the respective workers 100-1, 100-2, and 100-3 may check concentrations and fatigues (e.g., a state where an oxygen saturation is low, noise is low, and an EMG is low) of the respective workers and thus transmit personal contexts to the management server 200. Here, the personal contexts indicate necessities to increase or lower a speed of the conveyer.

Also, the management server 200 may collect received personal contexts to adjust a speed of the conveyer belt. Here, although there is a plurality of personal contexts, a small number of other personal contexts may not necessarily be adjusted.

For example, if the management server 200 receives personal contexts, indicating a need to increase a speed of a conveyer belt, from wearable apparatuses 100-1, 100-2, and 100-3 due to high concentrations of all of a plurality of workers, the management server 200 may increase the speed of the conveyer 11 such that the jobs are performed faster.

However, even if a concentration of one worker is low, and the management server 200 receives a plurality of personal contexts corresponding to a high concentration, the management server 200 may not necessarily change the speed of the conveyer belt 11. Also, the management server 200 may enable output of a warning message using the speaker 12 so as to increase a concentration of a corresponding worker.

Figure 25:
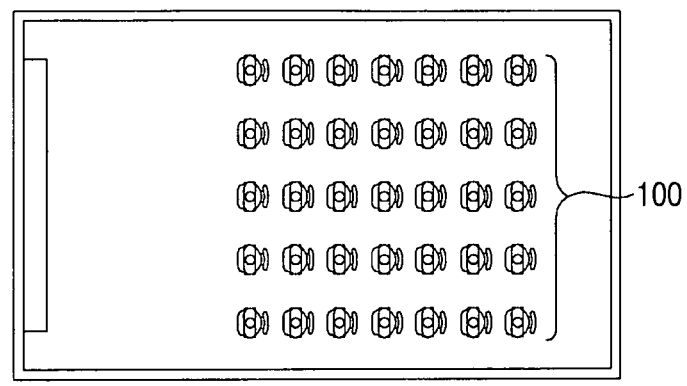

FIG. 25 is a diagram illustrating an example of a method in a theater environment according to an embodiment of the present disclosure.

Referring to FIG. 25, the management server 200 may respectively collect user environment information from wearable apparatuses 100 of users in a theater environment and calculate theatergoer evaluations of a corresponding movie based on the collected user environment information.

For example, the management server 200 may calculate theatergoer evaluations based on a ratio to users who are in a sleepy state, a ratio to users who are excited, and the number of changes in emotions described above. In detail, the management server 200 may average the number of excited states of each user (or the number of sad emotions) and subtract the average number of sleepy states to calculate theatergoer evaluations of a corresponding movie according to users. Also, the management server 200 may average of evaluations of users to automatically calculate evaluations of the corresponding movie. An evaluation of an individual and a plurality of evaluations may be calculated according to other methods in accordance with embodiments of the present disclosure.

Figure 26:
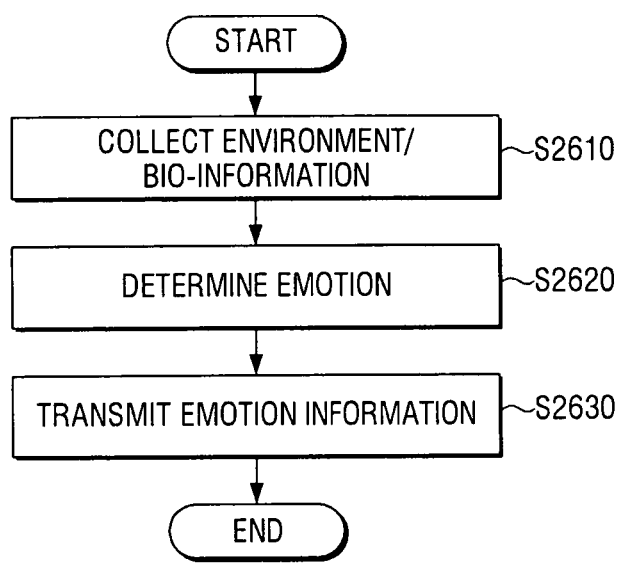
FIG. 26 is a flowchart illustrating a sensing operation of a wearable apparatus according to an embodiment of the present disclosure.

FIG. 26 is a flowchart illustrating a sensing method of a wearable apparatus according to an embodiment of the present disclosure.

Referring to FIG. 26, in step S2610, bio-signal information and location information of a user are collected. In detail, bio-signals, such as an ECG, an HRV, an EMG a GSR, an Sp02, a skin temperature, etc., may be collected, and then location information of the user may be collected based on GPS information, etc.

In step S2620, an emotion state of the user is determined based on the collected bio-signal information. More specifically, a pleasantness level and an arousal level may be extracted from the bio-signal information, and the emotion state may be determined as one of emotion states that are classified according to the extracted pleasant and arousal levels.

In step S2630, environment information is generated based on the determined emotion state, and the generated environment information is transmitted to the management server 200. More specifically, user situation information may be generated based on location information and schedule information of the user, and user environment information may be generated based on the previously generated emotion state and the user situation information. If the generated user environment information is approved by the user, or if the generated user environment information appropriate for a preset state, the user environment information may be transmitted to the management server 200.

In a controlling method of a wearable apparatus according to the above-described embodiment of the present disclosure, emotion information of each user or bio-information necessary for checking an emotion of each user may be provided to the management server 200. In the controlling method performed by the wearable apparatus, information indicating an emotion may be transmitted to the management server 200 with the exclusion of information associated with personal information. Therefore, the personal information may be prevented from being leaked due to an unnecessity of providing such information. The controlling method as described above with reference to FIG. 26 may be performed by a wearable apparatus having the structure shown and described with reference to FIG. 2 or by wearable apparatuses having other types of structures in accordance with embodiments of the present disclosure.

The above-described controlling method may be embodied as a program including a computer-executable algorithm. The program may be stored on a non-transitory computer readable medium.

Herein, a non-transitory computer readable medium is a medium that does not merely temporarily store data, such as a register, cache, and memory but stores data semi-permanently and is readable by devices. More specifically, the aforementioned applications, or programs may be stored in the non-transitory computer readable media, such as compact disks (CDs), digital video disks (DVDs), hard disks, Blu-ray disks, universal serial buses (USBs), memory cards, and read-only memory (ROM).

Figure 27:
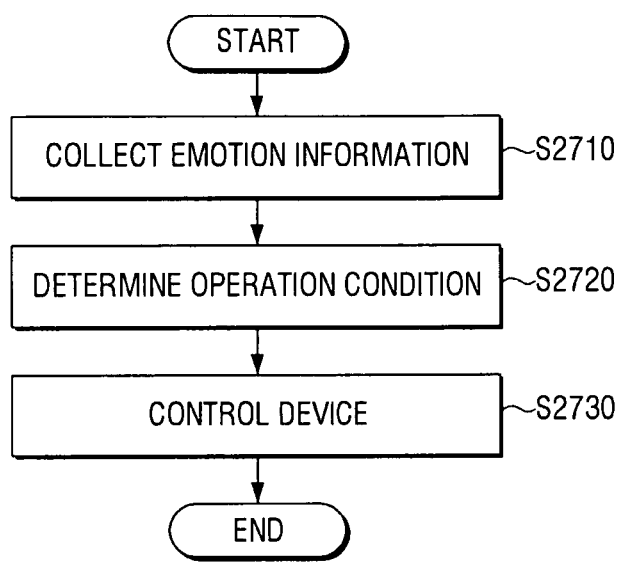
FIG. 27 is a flowchart illustrating a controlling operation of a management server according to an embodiment of the present disclosure.

FIG. 27 is a flowchart illustrating a controlling method of a management server according to an embodiment of the present disclosure.

Referring to FIG. 27, in step S2710, user environment information is respectively received from a plurality of wearable apparatuses located in a preset space. The received user environment information may be information (i.e., result information) that is determined based on user emotion information and user environment information or low data (e.g., bio-signal information, location information, schedule information, or the like) that is used to generate user environment information.

In step S2720, an environment state of the preset space is analyzed based on a plurality of pieces of received user environment information, and an operation state of a common device corresponding to the analyzed environment state is determined.

In step S2730, the common device may be controlled to operate in a manner corresponding to the determined operation state.

In a controlling method of a management server according to the above-described embodiment of the present disclosure, an environment state of a corresponding space may be checked based on user environment information received from a plurality of wearable apparatuses 100. Therefore, a common device in the corresponding space may be adaptively controlled. A controlling method as shown in FIG. 27 may be performed by a management server having the structure shown and described with reference to FIG. 4 or by management servers having other types of structures in accordance with embodiments of the present disclosure.

A controlling method as described above may be embodied as a program including a computer-executable algorithm. The program may be stored on a non-transitory computer readable medium to be provided.

Figure 28:
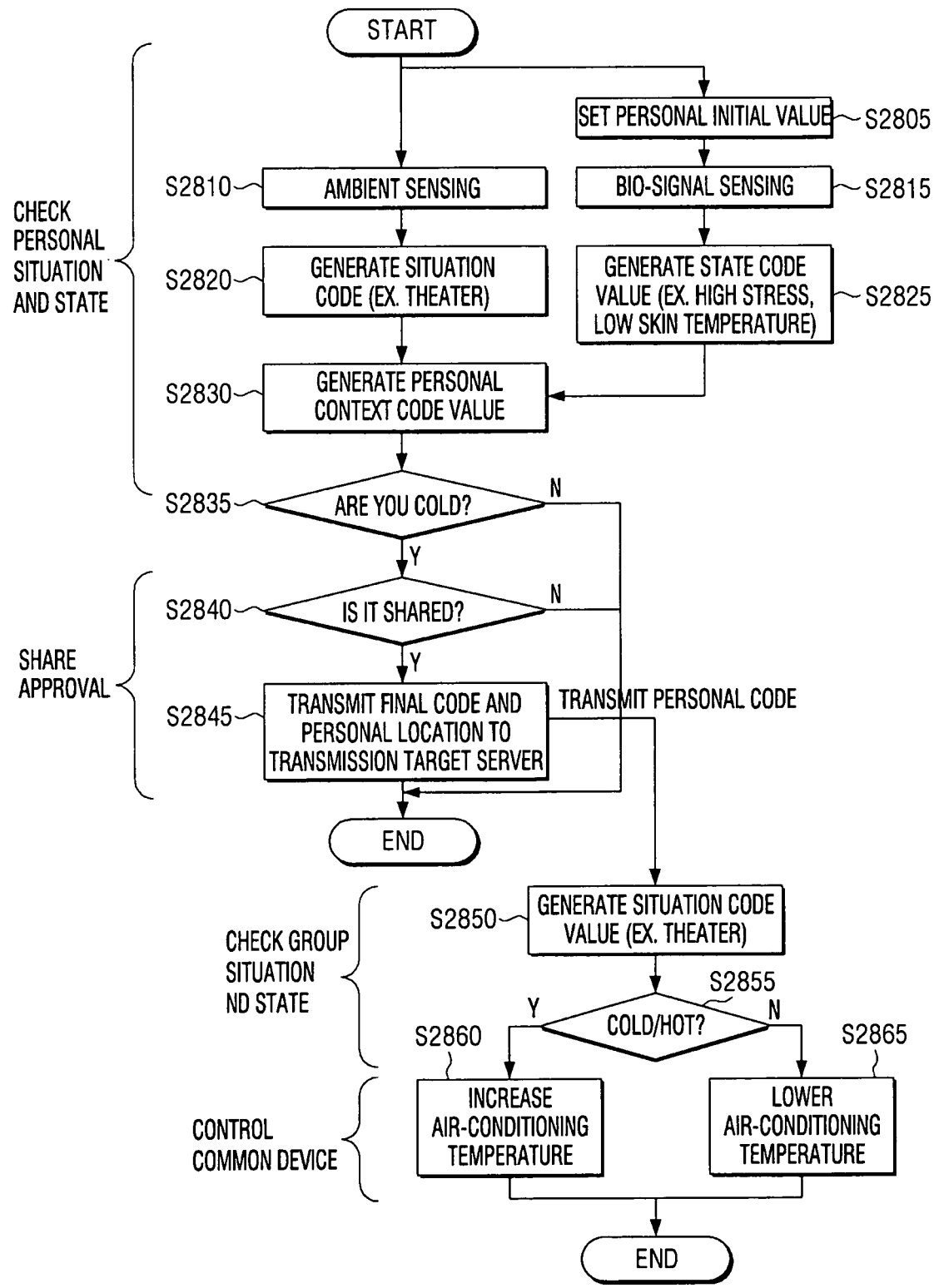
FIG. 28 is a flowchart illustrating a process of determining an operation state of a common device in a theater environment according to an embodiment of the present disclosure.

FIG. 28 is a flowchart illustrating a method of determining an operation state of a common device in a theater environment according to an embodiment of the present disclosure.

Referring to FIG. 28, if a user initially enters a theater environment, values of sensors and elements of a wearable apparatus 100 are initially set, in step S2805. In step S2810, the wearable apparatus 100 recognizes that the user enters a new environment and generates accumulated data about a personal behavior by using a sensor (e.g., a position sensor, an acceleration sensor, a GPS sensor, or the like) for sensing a user situation. In step S2820, user schedule information is checked to determine that the user is currently located in a theater, and a situation code is determined in consideration of the generated accumulated data.

In steps S2815 and S2825, accumulated data about a user bio-signal is generated by using a bio-signal sensor for determining a user emotion state.

If a situation code and an emotion code are determined, a temporary context code is determined by using the situation code and the emotion code, in step S2830.

If the determined temporary context code is a code corresponding to a cold emotion, a user is inquired about whether the user is in a cold state (e.g., via the wearable apparatus 100) to determine a final context code, in step S2835.

If a transmission of the determined context code is approved, the corresponding context code is transmitted to a server that is a transmission target, in step S2840.

In step S2850, the management server 200 receives the context code transmitted in step S2845 from each wearable apparatus and generates a situation code based on the received context codes.

In steps S2860 and 2865, a state of a common device corresponding to the determined environment is determined, and the common device is controlled according to the determined state of the common device. For example, if a plurality of users feels cold, a control for increasing a temperature may be performed. In an opposite case, a control for lowering the temperature may be performed.

The method of FIG. 28 is described above in terms of a system, while operations of a wearable apparatus and an operation of a management server are separately described as follows.

Figure 29:
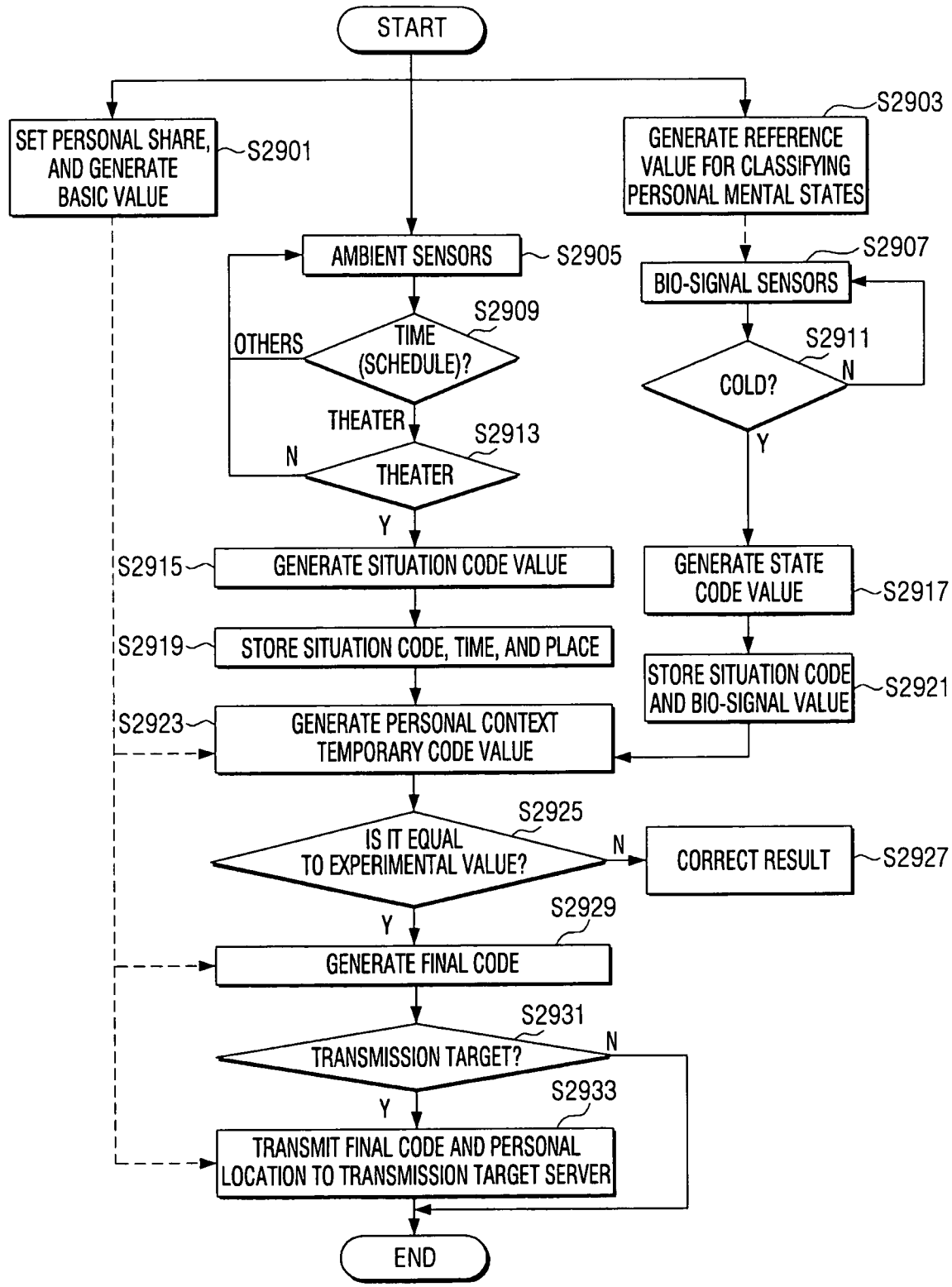
FIG. 29 is a flowchart illustrating a detailed operation in a wearable apparatus of FIG. 28 according to an embodiment of the present disclosure.

FIG. 29 is a flowchart illustrating a method performed by a wearable apparatus of FIG. 28 according to an embodiment of the present disclosure.

Referring to FIG. 29, if a user initially enters an initial theater environment, initial values of sensors and elements of a wearable apparatus 100 are set, in steps S2901 and S2903. Here, the wearable apparatus 100 may recognize that the user has entered a new environment and receives input indicating whether to transmit user environment information to the management server 200 of a corresponding space, from the user. A determination of whether to transmit the user environment information to the management server 200 may be set based on a checklist as described herein above.

In step S2905, the wearable apparatus 100 generates accumulated data about a personal behavior by using a sensor (e.g., a position sensor, an acceleration sensor, a GPS, or the like) for sensing a user situation.

In steps S2907, the wearable apparatus 100 generates accumulated data about a user bio-signal by using a bio-signal sensor for determining a user emotion state.

The wearable apparatus 100 checks a schedule of the user in a process of accumulating the above-described corresponding bio-signal, in step S2909 and determines whether the user is currently located in a theater, in step S2913. In steps S2915 and 2919, the wearable apparatus 100 determines a situation code by using the checked location of the theater and the accumulated data about the personal behavior.

If the wearable apparatus 100 senses that the user feels cold, through a skin temperature or the like based on accumulated bio-signals, in step S2911, the wearable apparatus 100 determines an emotion code corresponding to a corresponding emotion in steps S2917 and S2921.

If the situation code and the emotion code are determined, the wearable apparatus 100 determines a temporary context code by using the situation code and the emotion code, in step S2923. In step S2925, the wearable apparatus 100 performs a verification of a corresponding context code by using a sensor corresponding to the corresponding context code. In steps S2927 and S2929, the wearable apparatus 100 generates a final context code.

If the user determines not to transmit the user environment information, in step S2931, the generated final context code is not transmitted. However, if the user determines to transmit the user environment information in step S2931, the generated context code is transmitted to the management server 200, in step S2933.

Figure 30:
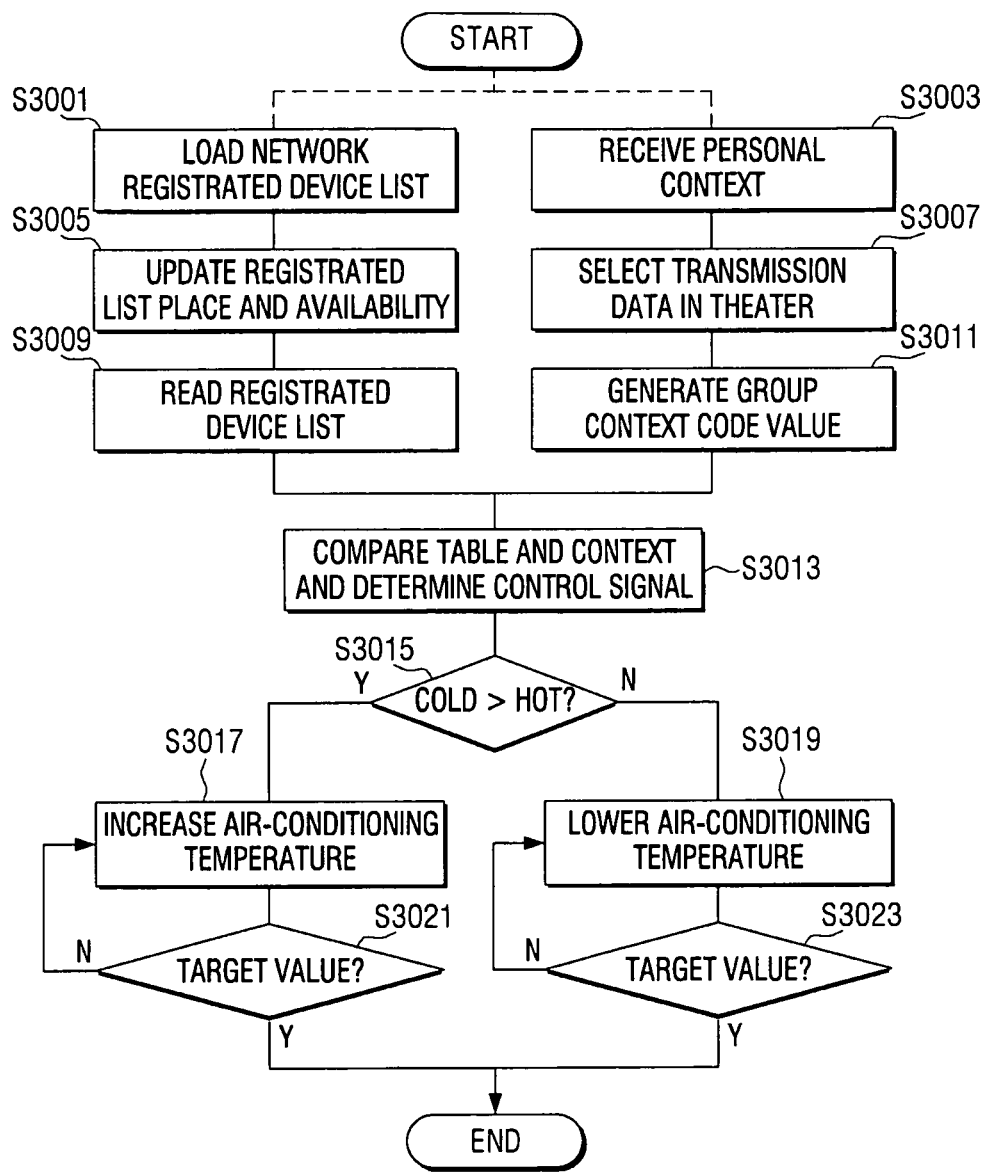
FIG. 30 is a flowchart illustrating a detailed operation in a management server of FIG. 28 according to an embodiment of the present disclosure.

FIG. 30 is a flowchart illustrating a method performed by a management server of FIG. 28 according to an embodiment of the present disclosure.

Referring to FIG. 30, in step S3001, the management server 200 loads a manageable apparatus (i.e., loads information regarding at least one apparatus that can be managed by the management server 200). The management server 200 checks a common device in a theater space of controllable apparatuses, in step S3005 and reads a list of the controllable apparatuses, in step S3009.

In step S3003, the management server 200 receives user environment information from each wearable apparatus. In step S3007, the management server 200 selects only pieces of user environment information of a wearable apparatus located in a theater environment among the received user environment information. In step S3011, the management server 200 determines an environment state of the theater environment based on the user environment information of the corresponding environment.

The management server 200 determines a state of a common device corresponding to the determined environment state by using a loaded device control reference table in step S3013 and controls the common device according to the determined state of the common device in steps S3017 and S3019. For example, if the determined environment state is a cold environment, the management server 200 may perform a control for increasing the temperature. If the determined environment state is a hot environment, the management server 200 may perform a control for lowering the temperature.

In steps S3021 and S3023, the management server 200 receives a feedback on an operation state from a corresponding common device and controls the corresponding common device until reaching a target state.

Figure 31:
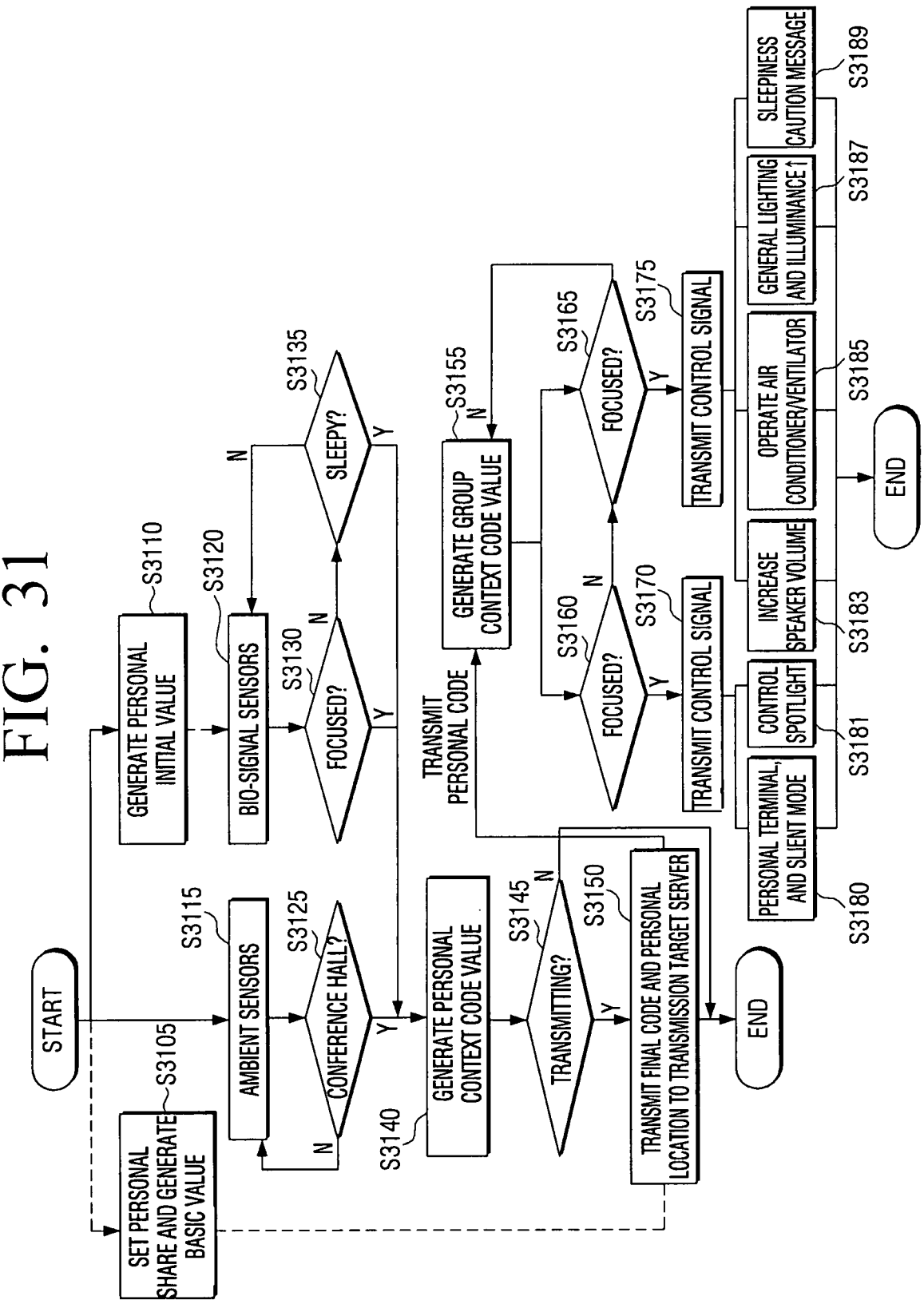
FIG. 31 is a flowchart illustrating a process of determining an operation state of a common device in a conference environment according to an embodiment of the present disclosure.

FIG. 31 is a flowchart illustrating a process of determining an operation state of a common device in a conference environment according to an embodiment of the present disclosure.

Referring to FIG. 31, if a user enters a conference environment (e.g., the user tags an employee card into a conference hall to enter the conference hall), initial values of sensors and elements of the wearable apparatus 100 are set in steps S3105 and S3110.

In step S3115, the wearable apparatus 100 generates accumulated data about a personal behavior by using a sensor (e.g., a position sensor, an acceleration sensor, a GPS, or the like) for sensing a user situation.

In step S3120, the wearable apparatus 100 generates accumulated data about a user bio-signal by using a bio-signal sensor for determining a user emotion state.

The wearable apparatus 100 checks a schedule of a user in a process of accumulating the above-described corresponding bio-signal in step S3125, determines whether the user is located in the conference hall where a conference is currently performed in step S3125, and determines a situation code by using the checked location of the conference hall and the accumulated data about the personal behavior.

In steps S3130 and S3135, the wearable apparatus 100 determines whether the user is in a focus state or in a sleepy state, based on the accumulated bio-signals and determine an emotion code corresponding to the checked state.

If the situation code and the emotion code are determined, the wearable apparatus 100 determines a temporary context code by using the situation code and the emotion code, in step S3140. In steps S3145 and S3150, the wearable apparatus 100 transmits the generated context code to the management server 200 according to a transmission or a non-transmission that is preset by the user.

In step S3155, the management server 200 respectively receives the above-described context codes from the wearable apparatuses and determines an environment state of the conference hall environment based on user environment information of the corresponding conference hall environment according to the received context codes.

In steps S3160, S3165, S3170, S3175, S3180, S3181, S3183, S3185, S3187, and S3189, the management server 200 determines a state of a common device corresponding to the determined environment state and controls the common device according to the determined state of the common device. A method of a common device described in detail herein with reference to FIG. 33.

Figure 32:
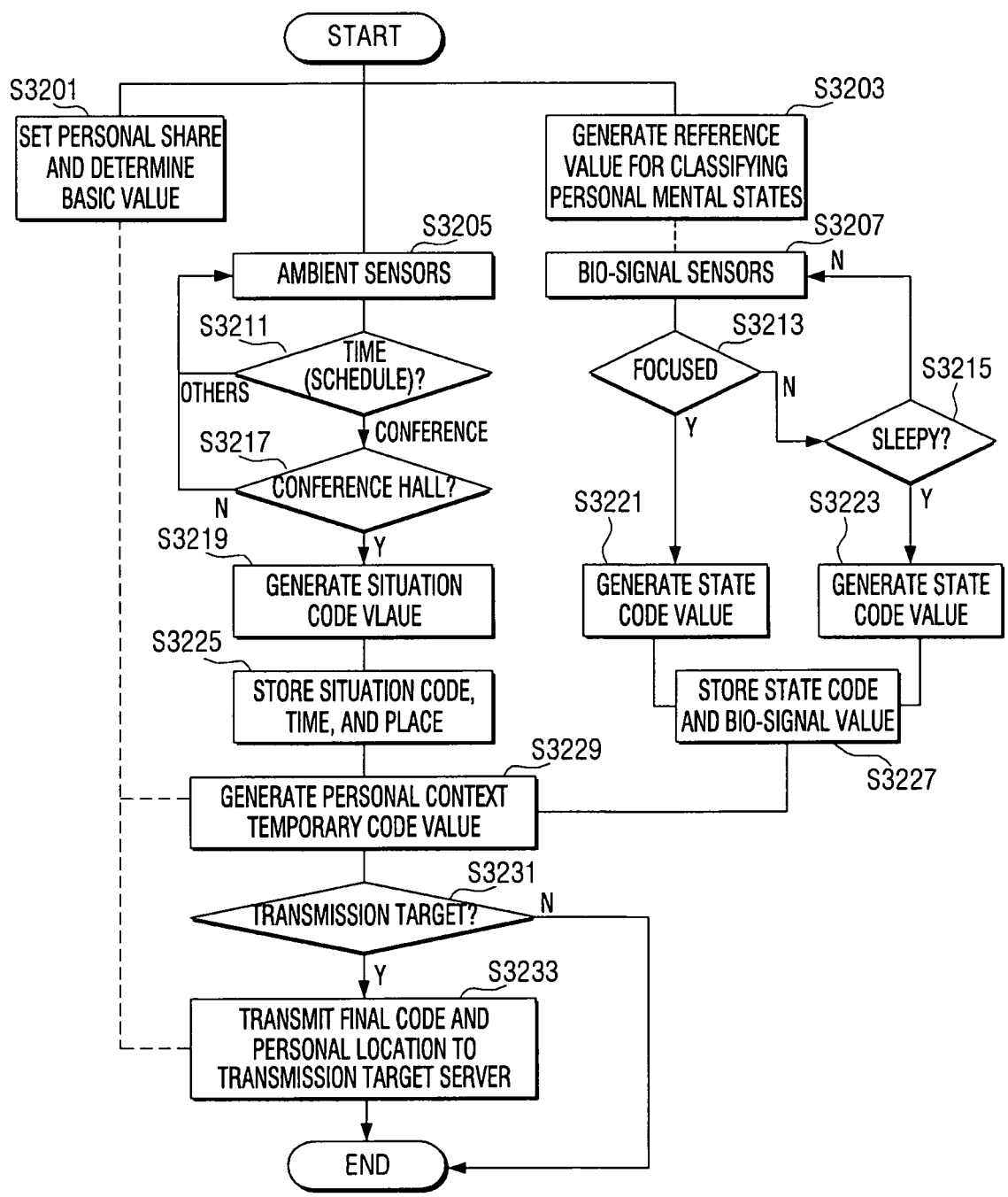
FIG. 32 is a flowchart illustrating a detailed operation in a wearable apparatus of FIG. 31 according to an embodiment of the present disclosure.

FIG. 32 is a flowchart illustrating a detailed method performed by a wearable apparatus of FIG. 31 according to an embodiment of the present disclosure.

Referring to FIG. 32, if a user enters a conference environment (e.g., the user tags an employee card into a conference hall to enter the conference hall), sensors and elements of the wearable apparatus 100 have initially set values in steps S3201 and S3203. Here, the wearable apparatus 100 recognizes that the user enters a new environment and receives, from the user, input indicating whether to transmit user environment information to the management server 200 of a corresponding space. The wearable apparatus 100 may alternatively set whether to provide user information to a server, based on the determined state as described above.

In step S3205, the wearable apparatus 100 generates accumulated data about a personal behavior by using a sensor (e.g., a position sensor, an acceleration sensor, a GPS, or the like) for sensing a user situation.

In step S3207, the wearable apparatus 100 generates accumulated data about a user bio-signal by using a bio-signal sensor for determining a user emotion state.

In step S3211, the wearable apparatus 100 checks a schedule of the user in a process of accumulating the above-described corresponding bio-signal and the data about the bio-signal. In step S3217, the wearable apparatus 100 determines whether the user is located in a conference hall where a conference is currently performed. In steps S3219 and S3225, the wearable apparatus 100 determines a situation code by using the checked location of the conference hall and the accumulated data about the personal behavior. In steps S3213, S3215, S3221, S3223, and S3227, the wearable apparatus 100 determines whether the user is in a focus state or a sleepy state, based on the accumulated bio-signals and determines an emotion code corresponding to the determined state.

If the situation code and the emotion code are determined, the wearable apparatus 100 determines a context code by using the situation code and the emotion code, in step S3229.

If the user determines not to transmit user environment information in step S3231, the wearable apparatus 100 does not transmit a generated final context code. However, if the user determines to transmit the user environment information in step S3231, the wearable apparatus 100 transmits the generated context code to the management server 200, in step S3233.

Figure 33:
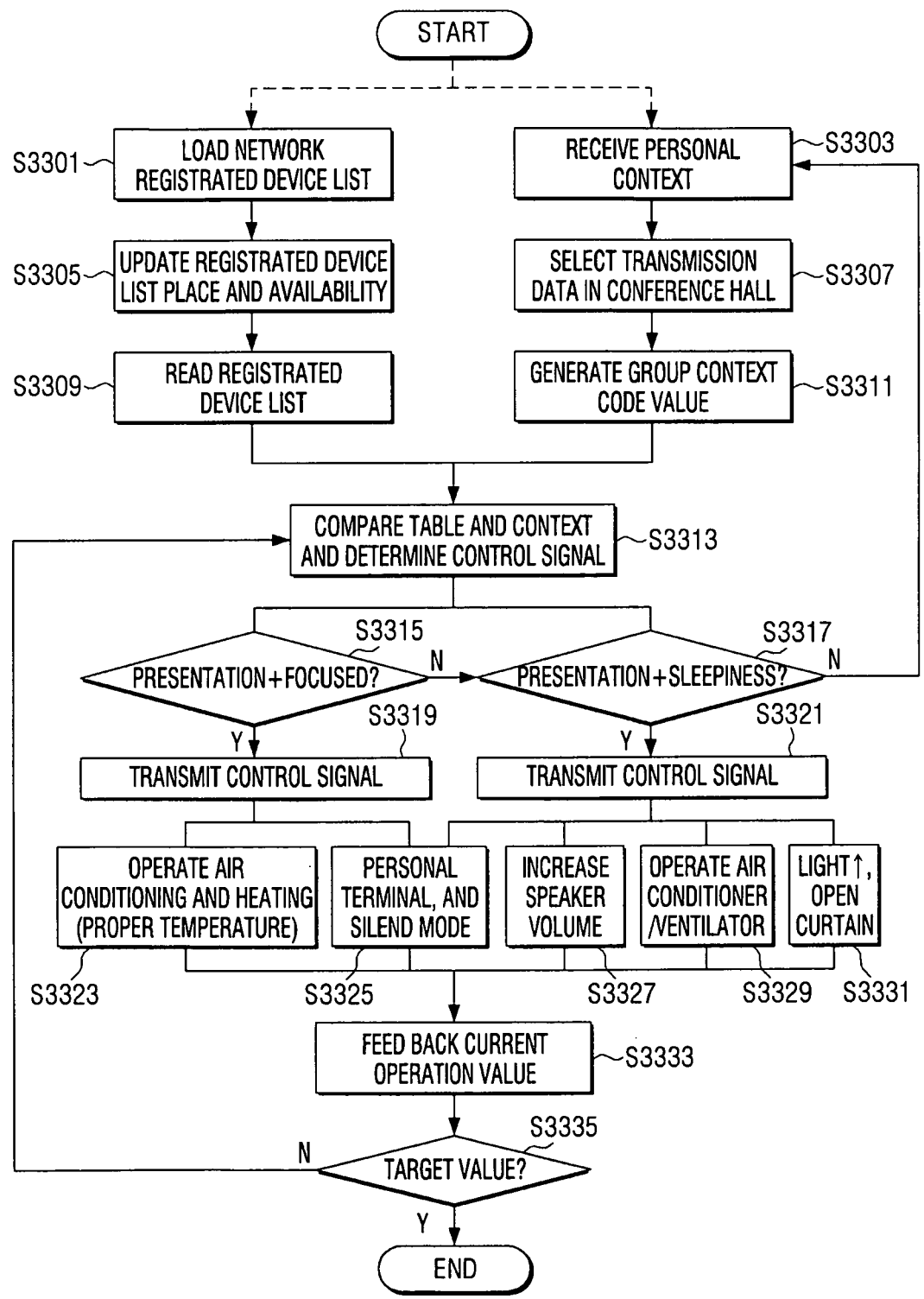
FIG. 33 is a flowchart illustrating a detailed opera\tion in a management server of FIG. 31 according to an embodiment of the present disclosure.

FIG. 33 is a flowchart illustrating a method performed by a management server of FIG. 31 according to an embodiment of the present disclosure.

Referring to FIG. 33, the management server 200 loads a manageable apparatus (i.e., loads information regarding at least one device that can be managed by the server 200), in step S3301. The management server 200 checks a common device of a conference hall space among controllable apparatuses in step S3305 and reads a list of the controllable apparatuses, in step S3309.

In step S3303, the management server 200 receives user environment information from each wearable apparatus. The management server 200 selects only received user environment information of wearable apparatuses located in a conference hall environment in step S3307 and determines an environment state of the conference hall environment based on the user environment information of the corresponding environment, in step S3311.

The management server 200 determines a state of a common device corresponding to the determined environment state by using a loaded device control reference table, in step S3313 and controls the common device according to the determined state of the common device, in steps S3315, S3317, S3319, and S3321. For example, if users are in focus states, the management server 200 performs a control for reducing an amount of air output by an air conditioner, in step S3323 and controls a wearable apparatus or a smartphone of users to operate in a silent state, in step S3325. However, if the users are determined to be sleepy, the management server 200 performs a control for increasing a volume of a speaker, in step S3327, controls an air conditioner to perform a ventilation, in step S3329, and performs a control for brightening a light, in step S3331. The management server 200 receives feedback regarding an operation state from the corresponding common device, in step S3333, and controls the corresponding common device until reaching a target state in step S3335.

While the present disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. A management server configured to be connected to a plurality of wearable apparatuses and an electronic device, the management server comprising:
    a transceiver; and
    a processor configured to:
    divide a predetermined space based on locations of the plurality of wearable apparatuses into a plurality of divided spaces,
    control the transceiver to receive a plurality of situation information from an environment sensor of the plurality of wearable apparatuses located in the predetermined space, with the plurality of situation information comprising user position information and user schedule information,
    obtain a user schedule corresponding to a current time based on the user schedule information,
    based on the user position information being a position corresponding to the obtained user schedule, determine a situation code based on the received situation information,
    control the transceiver to receive a plurality of bio-signal information from a biosensor of the plurality of wearable apparatuses located in the predetermined space,
    determine an emotion code based on the received plurality of bio-signal information,
    identify a context code of a space among the plurality of divided spaces based on the situation code and the emotion code,
    identify an operation state of the electronic device located in the space based on the identified context code of the space, the electronic device being connected to the plurality of wearable apparatuses, and
    control the transceiver to transmit a control signal to the electronic device based on the identified operation state.

2. The management server of claim 1, wherein a context code of each of the plurality of wearable apparatuses is identified based on an emotion code and a situation code of a corresponding user of a wearable apparatus of the plurality of wearable apparatuses.

3. The management server of claim 1, wherein the processor is further configured to:
 determine an emotion code of a user of each wearable apparatus of the plurality of wearable apparatuses based on the bio-signal information received from the plurality of wearable apparatuses, and
 identify the context code of the predetermined space based on the determined emotion code.

4. The management server of claim 3, wherein the processor is further configured to:
 extract a pleasantness level and an arousal level from the bio-signal information, and
 determine one of a plurality of emotion codes that are pre-classified based on the extracted pleasantness and arousal levels, as the determined emotion code.

5. The management server of claim 3, wherein the bio-signal information comprises information regarding at least one selected from an electrocardiogram (ECG), a heart rate variation (HRV), an electromyogram (EMG), a galvanic skin response (GSR), an oxygen saturation (Sp02), and a skin temperature.

6. The management server of claim 3,
 wherein the processor is further configured to:
 identify context code of each user based on the determined emotion code and a situation code of a user of each wearable apparatus of the plurality of wearable apparatuses, and
 identify the context code of the predetermined space based on the identified context code of each user.

7. The management server of claim 6, wherein the situation information comprises at least one selected from illuminance information and noise information.

8. The management server of claim 1, wherein the electronic device comprises at least one device selected from a lighting device, an air conditioner, and a speaker, and
 wherein the processor is further configured to control at least one setting selected from a brightness of the lighting device, a temperature of the air conditioner, a wind strength of the air conditioner, and a volume of the speaker.

9. The management server of claim 1, wherein the electronic device comprises a display apparatus, and
 wherein the processor is further configured to control the display apparatus to display a message depending on an identified operation state on the display apparatus.

10. A wearable apparatus configured to be connected to a management server, the wearable apparatus comprising:
 a transceiver;
 a biosensor;
 an environment sensor; and
 a processor configured to:
 control the transceiver to transmit and receive data to and from the management server, control the biosensor to collect bio signal information of a user, with the bio-signal information comprising at least one of a galvanic skin response (GSR), an oxygen saturation (Sp02), a lactic secretion, a blood pressure, a skin temperature, a body composition, and a metabolic state,
 determine an emotion code based on the collected bio signal information,
 control the environment sensor to collect situation information, with the situation information comprising user position information and user schedule information,
 obtain a user schedule corresponding to a current time based on the collected user schedule information,
 based on the user position information being a position corresponding to the obtained user schedule, determine a situation code based on the collected situation information,
 identify context code based on the situation code and the motion code, and
 control the transceiver to transmit the identified context code to the management server.

11. The wearable apparatus of claim 10, further comprising:
 a memory configured to store the user schedule information; and
 wherein the environment sensor is further configured to collect the user position information by checking a location of the wearable apparatus, and
 wherein the processor is further configured to:
 based on the collected user position information being the position corresponding to the obtained user schedule, determine the situation code, and
 identify the context code based on the determined emotion code and the determined situation code.

12. The wearable apparatus of claim 10, further comprising:
 a touchscreen configured to receive a transmission command of the situation information,
 wherein the processor is further configured to control transmitting the identified context code to the management server, in response to the transmission command being input.

13. The wearable apparatus of claim 12, wherein the touchscreen is further configured to, in response to a location environment of the wearable apparatus being changed, request the user of the wearable apparatus to input the transmission command.

14. The wearable apparatus of claim 10, wherein the processor is further configured to:
 receive, through the transceiver, an operation control command of the wearable apparatus, and
 control the wearable apparatus based on the received operation control command.

15. The wearable apparatus of claim 10, wherein the processor is further configured to:
 obtain a pleasantness level and an arousal level from the bio-signal information,
 identify one of a plurality of emotion codes that are pre-classified based on the extracted pleasantness and arousal levels, as an emotion state, and
 identify the context code based on the one of the plurality of emotion codes.

16. A management system, comprising:
 an electronic device configured to be located in a predetermined space;
 a plurality of wearable apparatuses configured to collect bio-signal information of users and generate situation information based on the collected bio-signal information, the electronic device being connected to the plurality of wearable apparatuses; and
 a management server configured to:
 divide the predetermined space based on locations of the plurality of wearable apparatuses into a plurality of divided spaces, receive the situation information from an environment sensor of the plurality of wearable apparatuses located in the predetermined space, with the situation information comprising user position information and user schedule information, obtain a user schedule corresponding to a current time based on the user schedule information, based on the user position information being a position corresponding to the obtained user schedule, determine a situation code based on the received situation information, receive a plurality of bio-signal information from a biosensor of the plurality of wearable apparatuses located in the predetermined space, determine an emotion code based on the received plurality of bio-signal information, identify a context code of a space among the divided spaces based on the situation code and the emotion code, identify an operation state of the electronic device located in the space among the divided spaces based on the identified context code of the space among the divided spaces, the electronic device being connected to the plurality of wearable apparatuses, and control the electronic device based on the identified operation state.

17. A method of controlling a management server configured to be connected to a plurality of wearable apparatuses and an electronic device, the method comprising:

dividing a predetermined space based on locations of the plurality of wearable apparatuses into a plurality of divided spaces, receiving a plurality of situation information from an environment sensor of the plurality of wearable apparatuses located in the predetermined space, with the plurality of situation information comprising user position information and user schedule information;

obtaining a user schedule corresponding to a current time based on the user schedule information;

based on the user position information being a position corresponding to the obtained user schedule, determining a situation code based on the received plurality of situation information, receiving a plurality of bio-signal information from a biosensor of the plurality of wearable apparatuses located in the predetermined space;

determining an emotion code based on the received plurality of bio-signal information, identifying a context code of a space among the divided spaces based on the situation code and the emotion code;

identifying an operation state of the electronic device located in the space among the divided spaces based on the identified context code of the space among the divided spaces, the electronic device being connected to the plurality of wearable apparatuses; and controlling the electronic device based on the identified operation state.

18. The method of claim 17, wherein a context code of each of the plurality of wearable apparatuses is identified based on an emotion code and user a situation code of a corresponding user of a wearable apparatus of the plurality of wearable apparatuses.

19. The method of claim 17, wherein the situation information comprises bio-signal information measured from the plurality of wearable apparatuses, and wherein an emotion code of a user of each wearable apparatus is determined based on the bio-signal information received from the plurality of wearable apparatuses, and the context code of the predetermined space is obtained based on the determined emotion code.

20. A non-transitory computer readable medium comprising a program for executing a method of controlling a management server configured to be connected to a plurality of wearable apparatuses and an electronic device, wherein the method comprises:

dividing a predetermined space based on locations of the plurality of wearable apparatuses into a plurality of divided spaces, receiving a plurality of situation information from an environment sensor of the plurality of wearable apparatuses located in the predetermined space, with the plurality of situation information comprising user position information and user schedule information;

obtaining a user schedule corresponding to a current time based on the user schedule information;

based on the user position information being a position corresponding to the obtained user schedule, determining a situation code based on the received plurality of situation information;

receiving a plurality of bio-signal information from a biosensor of the plurality of wearable apparatuses located in the predetermined space;

determining an emotion code based on the received plurality of bin-signal information;

identifying a context code of a space among the divided spaces based on the situation code and the emotion code;

identifying an operation state of the electronic device located in the identified space among the divides spaces based on the identified context code of the identified space among the divided spaces, the electronic device being connected to the plurality of wearable apparatuses; and controlling the electronic device based on the identified operation state.

* * * * *